(12) United States Patent
Gaddam et al.

(10) Patent No.: US 12,041,140 B2
(45) Date of Patent: Jul. 16, 2024

(54) REAL-TIME ENTITY ANOMALY DETECTION

(71) Applicant: Visa International Service Association, San Francisco, CA (US)

(72) Inventors: Ajit Gaddam, Foster City, CA (US); Ara Jermakyan, Northridge, CA (US); Pushkar Joglekar, Emeryville, CA (US)

(73) Assignee: Visa International Service Association, San Francisco, CA (US)

( * ) Notice: Subject to any disclaimer, the term of this patent is extended or adjusted under 35 U.S.C. 154(b) by 959 days.

(21) Appl. No.: 17/044,552

(22) PCT Filed: Apr. 2, 2018

(86) PCT No.: PCT/US2018/025736
§ 371 (c)(1),
(2) Date: Oct. 1, 2020

(87) PCT Pub. No.: WO2019/194787
PCT Pub. Date: Oct. 10, 2019

(65) Prior Publication Data
US 2021/0160247 A1    May 27, 2021

(51) Int. Cl.
*H04L 67/50*    (2022.01)
*G06F 18/214*    (2023.01)
(Continued)

(52) U.S. Cl.
CPC .......... *H04L 67/535* (2022.05); *G06F 18/214* (2023.01); *G06F 18/24* (2023.01);
(Continued)

(58) Field of Classification Search
CPC ... H04L 67/535; H04L 63/102; H04L 63/105; H04L 63/20; H04L 67/306; G06F 18/214; G06F 18/24; G06N 20/20
See application file for complete search history.

(56) References Cited

U.S. PATENT DOCUMENTS

| | | |
|---|---|---|
| 2004/0122790 A1 | 6/2004 | Walker et al. |
| 2004/0186724 A1 | 9/2004 | Morin |

(Continued)

FOREIGN PATENT DOCUMENTS

WO    2017162053    9/2017

OTHER PUBLICATIONS

Application No. PCT/US2018/025736, International Search Report and Written Opinion, dated Jan. 3, 2019, 12 pages.

*Primary Examiner* — Quoc A Tran
(74) *Attorney, Agent, or Firm* — Kilpatrick Townsend & Stockton LLP

(57) ABSTRACT

Methods and systems for analyzing request to access resources and determining a resource access policy are provided. The resource access system can train, store, evaluate, and deploy machine learning models that learn to output a trust score associated with a resource access request, the trust score relating to the request's legitimacy. A resource access system can receive a request for a resource from a requesting entity. The resource access system can determine an entity profile using request data in the request. The resource access system can request data from the request to determine whether the request is normal or anomalous. Using a policy engine, the resource access system can determine a resource access policy, such as allowing or denying access to the resource.

20 Claims, 14 Drawing Sheets

(51) Int. Cl.
*G06F 18/24* (2023.01)
*G06N 20/20* (2019.01)
*H04L 9/40* (2022.01)
*H04L 67/30* (2022.01)

(52) U.S. Cl.
CPC .......... *G06N 20/20* (2019.01); *H04L 63/102* (2013.01); *H04L 63/105* (2013.01); *H04L 63/20* (2013.01); *H04L 67/30* (2013.01)

(56) References Cited

U.S. PATENT DOCUMENTS

| | | | |
|---|---|---|---|
| 2010/0077483 A1* | 3/2010 | Stolfo | G06F 21/554 726/23 |
| 2014/0379619 A1 | 12/2014 | Permeh et al. | |
| 2016/0225076 A1 | 8/2016 | Merrill et al. | |
| 2017/0187703 A1* | 6/2017 | Enrique Salpico | H04L 63/162 |
| 2018/0069867 A1* | 3/2018 | Grajek | G06N 7/00 |
| 2022/0263860 A1* | 8/2022 | Crabtree | H04L 63/1425 |

* cited by examiner

REAL-TIME ENTITY ANOMALY DETECTION

This application is a National Stage of International Application No. PCT/US2018/025736, filed on Apr. 2, 2018, which is herein incorporated by reference in its entirety.

BACKGROUND

Controlling access to sensitive resources is a fundamental problem in computer security. Computer systems, such as web servers, are frequently accessed by large numbers of entities, some legitimate, and others malicious. An ideal system complete prevents malicious or illegitimate users from accessing the sensitive resources, and provides no difficulty to legitimate users. However, conventional systems are far from ideal. As of writing, hundreds of millions of digital records are stolen every year, often from large companies employing state of the art identity and access management system.

Traditional identity and access management systems rely heavily on human decision making. Human experts look over data such as access logs to identify security breaches or suspicious activity. Malicious users frequently exploit human weakness in order to defeat such systems. Often, experts don't realize breaches have occurred until it is too late to stop them.

Conventional identity and access management systems use rule based approaches to analyzing access requests. For example, a conventional identity and access management system can determine the IP address associated with a request and compare the IP address against a blacklist, blocking the request if the IP address shows up in the blacklist and approving the request otherwise.

These rule based systems can be easily exploited by knowledgeable malicious entities. For example, in order to evade an IP blacklist, a malicious entity can spoof their IP or otherwise reroute their network traffic through a proxy or intermediary. Some rule based systems attempt to consider or evaluate multiple factors in determining whether a request is malicious or not. However, regardless of their complexity, once a malicious entity determines the criteria used to evaluate whether a request is legitimate, the malicious entity can simply form their requests to satisfy the criteria, such that the rule-based system is no longer useful for identifying malicious requests originating from that entity.

Embodiments of the invention address these and other problems, individually and collectively.

SUMMARY

Embodiments are directed to a resource access system and associated methods for analyzing requests to access resources and determining resource access policies. A resource access system can receive a request to access a resource (for example, a physical resource, such as a car, or an electronic resource, such as a cryptographic key) from a requesting entity (for example, a user, a client computer, or a computer network). In order to protect resources from malicious entities, the resource access system analyzes the request to determine a trust score, which can be based off the entity's behavioral characteristics, inferred from request data in the request. Based on the trust score, the resource access system can determine a resource access policy, such as allowing the requesting entity to access the resource or denying access to the resource.

The resource access system can train machine learning models for each entity that requests access to resources. The models can be ensemble classifier models that can be continually or periodically trained on new training data collected from new requests to access resources.

One embodiment is directed to a method comprising: determining, by a resource access system, a first plurality of analytical model types; creating, by the resource access system, for each first analytical model type, a plurality of first submodels, the first submodels for each first analytical model type differing by one or more hyperparameters; training, by the resource access system, the plurality of first submodels using first training data corresponding to an entity of a plurality of entities; determining, by the resource access system, a combination of first submodels to form an ensemble classifier model corresponding to the entity; and storing, by the resource access system, the ensemble classifier model in a model cache, wherein the model cache stores a plurality of ensemble classifier models corresponding to the plurality of entities respectively Another embodiment is directed to a resource access system comprising: a processor; and a non-transitory computer readable medium coupled to the processor, the non-transitory computer readable medium comprising code executable by the processor for performing the above-noted method.

Another embodiment of the invention is directed to a method comprising: receiving, at a resource access system, from a machine learning model requestor, a request for a machine learning model, the request for the machine learning model comprising a query and a training data set; determining, by the resource access system, based on the query and using natural language processing, a model cache query; determining, by the resource access system, a machine learning model, wherein the machine learning model is determined by searching a model cache using the model cache query; and transmitting, by the resource access system, the machine learning model to the machine learning model requestor. Yet another embodiment of the invention is directed to a resource access system that comprises code for performing the method.

Prior to discussing specific embodiments of the invention, some terms may be described in detail.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Inters Celeron, Itanium, Pentium, Xeon, and/or XScale; and/or the like processor(s).

An "entity" can include a thing with distinct and independent existence. For example, people, organizations (for example, partnerships, businesses), computers, and computer networks, among others. An entity may additionally include code or data, such as an application programming interface or an application programming interface key. An entity can communicate or interact with its environment in some manner. Further, an entity can operate, interface, or interact with a computer or computer network during the course of its existence.

A "resource" can include something that can be provided to an entity. A resource can include a physical good that can be transferred between entities, such as food, a car, etc. Further, a resource may also include a service that can be provided to an entity. Additionally a resource may also include permission or access rights, for example, access to a building or a database. A resource may also be a secure location (e.g., a building, room, or transit station). A resource can be electronic, and may include code, data, or other information that can be transmitted between entities electronically, for example, digital representations of music or cryptographic keys. A resource can be provided by a "resource provider," an entity associated with providing resources, such as a webserver, merchant, government, etc.

A "user" can include something that uses something else for some purpose. For example, a user may use a computer as a means to achieve some end. A user may be a person or another computer, for example, a computer that uses subordinate computers in performing programmed routines or functions.

A "user computer" can include a computer owned or associated with a user. For example, a user computer can include a desktop computer, a laptop computer, a smart phone, a wearable device such as a smart watch, a videogame console, a vehicle such as a smart car, among others. A user may use a user computer to perform tasks associated with computers, such as browsing the Internet, checking email, drafting documents, engaging in e-commerce, receiving or transferring digital resources, etc.

A "client computer" can include a computer that accesses services made available by a server. For example, a client computer can be a computer that receives resources from a server computer. A client computer can be a user computer. A client computer can also be a computer operating autonomously or semi-autonomously as part of a machine to machine network of computers.

A "requesting entity" can include an entity that requests a resource or requests access to a resource. For example, a requesting entity can include a user that requests access to emails stored on an email server. A requesting entity can also include the user computer that the user uses to request access to resources, or a client computer, or any other entity capable of requesting access to resources.

An "entity profile" can include a profile or collection of data about an entity, such as a requesting entity. An entity profile can be determined or generated from request data associated with a resource access request and a requesting entity. For example, an entity profile for a human user could comprise information including a user identifier (such as a name), where the user lives, where the user works, how old the user is, other entities the user associates with, etc. An entity profile can comprise information that can be used to uniquely identify the entity associated with an entity profile. Entity profiles can be represented electronically and can be stored in an entity profile database or other suitable data structure.

A "resource gateway" can include an intermediary between an entity and a resource. A resource gateway can include a computer system through which resources can be delivered. For example, a resource gateway can include a computerized gate between an entity and a resource, the resource gateway can be locked or unlocked to either allow or deny an entity access to the resource. A resource gateway can also include an intermediate computer between an entity, such as a requesting entity, and a resource server or resource database. The resource gateway may mediate the transfer of resources to the entity from the resource server or resource database A "resource access request" or "request to access a resource" can include a request to receive or access a resource. A resource access request can originate from a requesting entity. A resource access request can take the form of an electronic message transmitted between entities. For example, a user, operating a user computer, can transmit a resource access request to a web-based email server in order to access the user's emails. A resource access request may comprise request data.

"Request data" can include data associated with or included with a request. For example, request data can include data associated with a resource access request. This may include a credential or identifier, such as a username and password, the time at which the request was made, the location the request originated from, etc. The request data can be represented in some machine-readable electronic form and included with the request. Request data can also not be included with the request, but instead inferred from the request. For example, the time at which the request is received can be determined by a receiving entity without being included in the request itself. Request data can be used to generate feature vectors or determine entity profiles.

A "resource access system" can include a system that evaluates resource access requests, controls access to resources, and/or services resource access requests. A resource access system be associated with a resource gateway. A resource access system can evaluate resource access requests and determine how to respond to resource access requests. A resource access system can be implemented on a computer or a collection of computers. A resource access system can comprise a number of subsystems. Each subsystem can perform some function associated with controlling access to resources or servicing resource access requests. In some instances, a resource access system may comprise one or more computers along with a "security operations center." For example, a resource access system for a building can include a computer that processes resource access requests, along with a surveillance room manned by surveillance personnel. A resource access system can make use of machine learning models or other machine learning techniques in evaluating resource access requests. A resource access system can generate, produce, determine, and/or enforce a resource access policy.

A "resource access policy" can include a course or principle of action regarding a resource. A resource access policy can determine the manner in which resources are accessed by entities. For example, a resource access policy can deny access to a resource, or alternatively allow access to a resource. A resource access policy can include additional steps or procedures to evaluate or service resource access requests. For example, a resource access policy can include transmitting a request for additional data to a requesting entity in order to determine if the requesting entity should be granted access to the resource. A resource access policy can be determined by a policy engine, which can be code, software, or hardware used to determine resource access policies.

A "feature vector" can include a vector of features that represent some object or entity. A feature vector can be determined or generated from request data. A feature vector can be used as the input to a machine learning model, such that the machine learning model produces some output or classification. A feature vector can comprise one or more features. For example, a feature vector for a human entity can include features such as age, height, weight, a numerical representation of their relative happiness, etc. Feature vectors can be represented and stored electronically, in for example, a feature vector database or feature store. Further, a feature vector can be normalized, i.e., be made to have unit length.

An "analytical model type" can include a type, classification, or family of machine learning models. For example, a support vector machine, logistic regression model, binary classifier, etc. An analytical type can be a property of a machine learning model or submodel. An analytical model type can have a number of associated hyperparameters.

An "ensemble classifier model" can include collection, combination, or ensemble of submodels that collectively produce a classification given an input, such as a feature vector. For example, an ensemble classifier model can receive a feature vector corresponding to the behavior of an entity, and produce an output classification such as "normal behavior" or "abnormal behavior." An ensemble classifier model can produce a discrete or continuous output classification. An ensemble classifier can produce a score on a range that indicates the classification. For example, a score of 100 indicates normal behavior, a score of 0 indicates abnormal behavior, and a score in between indicates some combination of abnormal and normal behavior.

An ensemble classifier model can use some appropriate method to combine the outputs from machine learning models. For example, the submodels that make up the ensemble classifier model can each produce an output and the outputs can be combined to produce the ensemble classifier model output. For example, the outputs of each submodel can be weighted with some value, and the output of the ensemble classifier model can be the weighted average of the submodel outputs. An ensemble classifier can comprise submodels of a variety of analytical model types including unsupervised or supervised submodels.

A "submodel" can include a machine learning model used as part of a larger machine learning model or system. For example, a submodel can include a model that is used along with other submodels in an ensemble classifier. A submodel can correspond to an analytical model type. For example, a submodel can be a support vector machine, and therefore correspond to a support vector machine analytical model type. A submodel can be a supervised machine learning model that receives labeled training data and learns to classify inputs, such as feature vectors, based on learning characteristics of the labeled training data. A submodel can also be an unsupervised machine learning model that receives unlabeled training data and learns how to categorize inputs based on learning characteristics of the unlabeled training data.

A "hyperparameter" can include a parameter of a machine learning model that is set before learning begins. For example, a "long short-term memory" machine learning model can have has hyperparameters corresponding to learning rate, network size, batching, and momentum. The value of a hyperparameter can affect the training and performance of a machine learning model. Hyperparameters can be set manually (for example, by a human expert). Alternatively, hyperparameters can be determined through hyperparameter searching.

A "model cache" can include a database that can store machine learning models. Machine learning models can be stored in a model cache in a variety of forms, for example, as a collection of parameters, hyperparameters, and a label indicating the corresponding analytical model type. Models stored in a model cache may be stored in association with entity profiles, such that each model in the model cache corresponds to a specific entity profile. Models in a model cache may also be stored in association with keywords that communicate some aspect of the model. For example, a model used to evaluate entity behavior in accessing resources may be stored in a model cache in association with the keywords "behavior," "resource access," and "security." Computer systems and subsystems can access a model cache or model caches and retrieve models from the cache, modify models in the cache, delete models from the cache, or add models to the cache. Additionally, computer systems and subsystems can modify any associations between models and entity profiles, keywords, or the like.

A "production model" can include a machine learning model that has been trained and is being used for some purpose. For example, an ensemble classifier model can be trained to evaluate requesting entity behavior, and is put into production when it is being used for that purpose. A production model can be tested against other models to evaluate its performance.

A "trust score" can include a score used to indicate trust in something. For example, a trust score can be the output of an ensemble classifier model that is trained to determine whether requesting entity behavior is anomalous or not. A high trust score (for example, 100 on a 0-100 scale) can indicate total trust that the requesting entity is behaving normally, while a low trust score (for example, 0 on a 0-100 scale) can indicate no trust that the requesting entity is behaving normally. A trust score can be further evaluated to determine or enact a policy, such as a resource access policy.

"System level triage" can include operations or actions performed by a computer system in response to an event or resource access policy. For example, a computer system of a resource access system can perform system level triage in response to a low trust score corresponding to a resource access request. The operations or actions of a system level triage can comprise, for example, requesting additional request data from the requesting entity (such as a biometric for a human entity), among others. System level triage may result in a further resource access policy, such as allowing or denying access to the requested resource.

"Human level triage" can include operations or actions performed by human analysts in response to an event or resource access policy. For example, a human analyst, operating in association with a security operations center subsystem of a resource access system can perform human level triage in response to a low trust score corresponding to a resource access request. A human level triage can comprise, for example, the human analyst communicating with and evaluating the requesting entity, and/or evaluating a feature vector or request data associated with the request, among others. Human level triage may result in a further resource access policy, such as allowing or denying access to the requested resource.

A "data lake" can include a storage repository that holds raw or minimally processed data before further processing. A data lake can, for example, store request data before the request data is further processed to determine entity profiles and generate feature vectors.

"A/B testing" can include controlled experiments or tests of two variables. For example, an A/B test can be used to determine which machine learning model of two machine learning models performs better according to some criteria.

"Natural language processing" can include systems, methods, and techniques used to process natural language data, for example, human speech or writing. A machine such as a computer can make use of natural language processing techniques, such as artificial intelligence techniques to develop machine understanding of language. For example, a natural language processing apparatus can parse a typed sentence and determine the subject, intent, and other meaning associated with that sentence.

A "machine learning model requestor" can include an entity that requests a machine learning model for some application. For example, a machine learning model requestor can be a human that wants a machine learning model to predict the price of a stock given some input features. A machine learning model requestor can provide a machine learning model request, along with training data to a system, such as a resource access system, requesting the resource access system to determine and train a model that can meet the entity's need. The machine learning model request can take the form of an input string, such as a sentence or a recording of human speech. The receiving system can use natural language processing to interpret the request, determine an appropriate machine learning model, and transmit the machine learning model to the machine learning model requestor.

An "application programming interface" (API) can include a set of subroutines, protocols, and tools for building application software or interfacing with an application. For example, an API can be used by a client computer in order to communicate with an application running on a server computer. A client computer can use an API to request that a server computer retrieve data from a database coupled to the server computer and transmit that data to the client computer.

An "application programming interface key" (API key) can include a cryptographic key used in conjunction with an API. For example, an API can be configured such that a client cannot communicate with the application unless they provide the correct API key.

DETAILED DESCRIPTION

Figure 1:
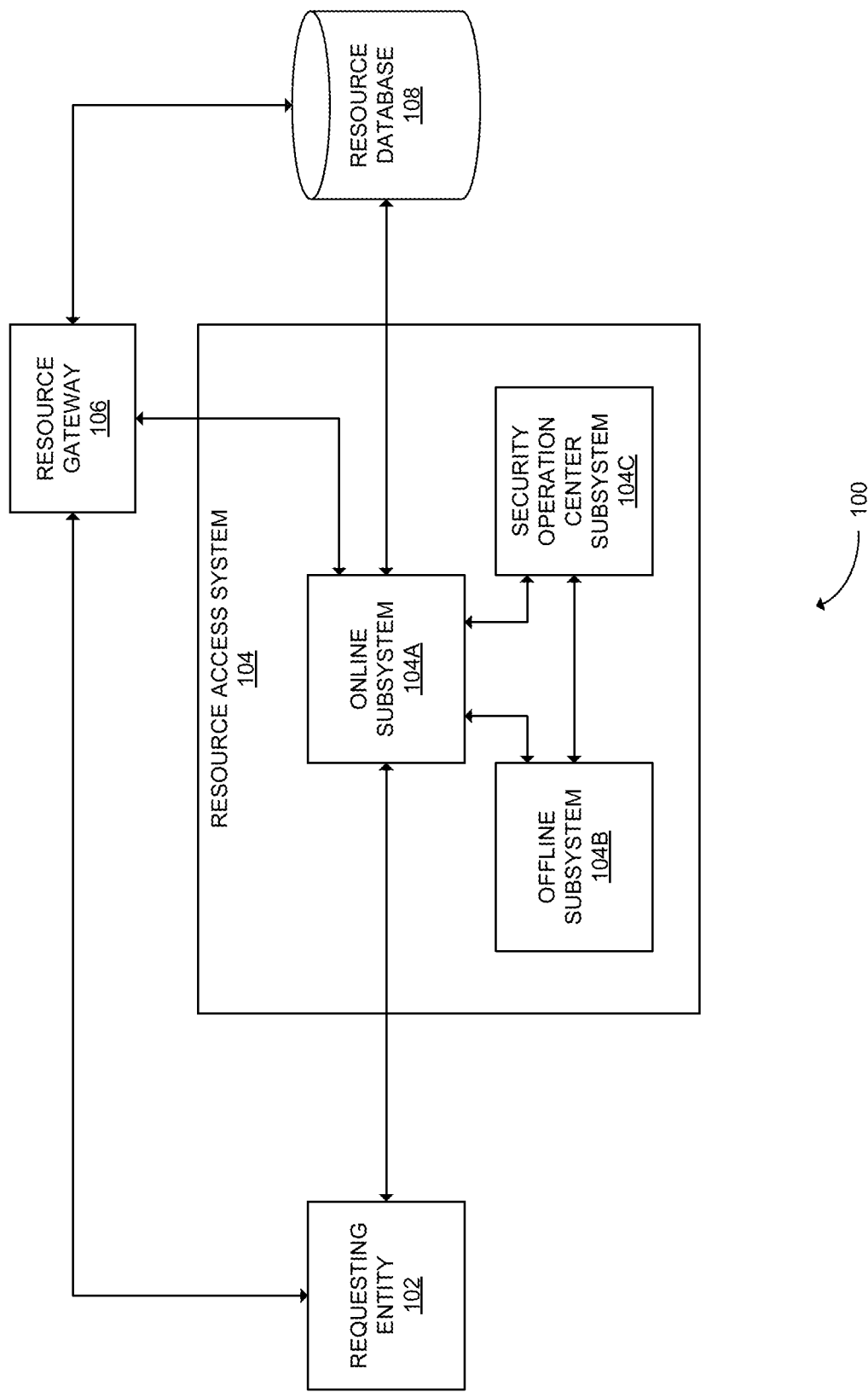
FIG. 1 shows a system block diagram of an exemplary access and access evaluation system including a resource access system according to some embodiments.

Embodiments are directed to a resource access system and associated methods for controlling access to resources. The resource access system can employ novel machine learning techniques in order to train and use machine learning models to determine whether a request to access a resource is legitimate. These include developing a behavioral model for each requesting entity that makes requests to access resources. The resource access system can use a policy engine to determine an appropriate resource access policy based on the trust score.

As a non-limiting example, the resource access system may be employed to protect cryptographic keys. In this example, an entity requests a cryptographic key stored in a secure database. The resource access system analyzes the request, determines a trust score, and determines a resource access policy, such as a resource access policy granting the entity access to the cryptographic key. As another non-limiting example, the resource access system may be employed to protect access to physical locations. In this example, an entity requests access to a room in a secure building. The resource access system analyzes the request, determines a trust score, and determines a resource access policy, such as a resource access policy denying the entity access to the room.

The resource access system can be divided into three major subsystems: an online subsystem, an offline subsystem, and a security operations center subsystem.

The online subsystem can receive requests to access resources, generate trust scores in real-time using a production model, and determine a resource access policy based on the trust scores using a policy engine.

The offline subsystem can determine and generate entity profiles, store feature vectors and trust scores in their respective databases, periodically train and retrain ensemble classifier models, store machine learning models in a model cache, transmit feature vectors and trust scores to the security operation center subsystem for evaluation, receive feature vectors and trust scores from the security operations center subsystem, evaluate the performance of machine learning models to determine the best performing machine learning model, and/or deploy the best performing machine learning model as the production model in the online subsystem, among other operations.

Generally, the online subsystem interacts with external systems and applies a production model to evaluate resource access requests, whereas the offline subsystem interacts with the online subsystem and security operations center subsystem to train and evaluate machine learning models corresponding to different entities. By separating the online and offline subsystems, the resource access system can evaluate and respond to requests to access resources in real time, while simultaneously training, evaluating, and improving underlying machine learning models.

The security operations center subsystem can comprise human (or machine) analysts that receive feature vectors and trust scores from the offline subsystem, verify the received feature vectors and trust scores, and transmit the verified feature vectors and trust scores back to the offline subsystem. The security operations center subsystem can also be involved in enacting a resource access policy, for example, by performing triage to determine whether a request to access a resource is legitimate.

In more detail, the resource access system receives requests to access resources at the online subsystem. The resource access system can receive the requests from a requesting entity itself (such as a user or client computer) or from another system (such as a resource gateway or an identity and access management system). Requests to access resources can include request data, including credentials (for example, usernames and passwords), timestamps, locations, input metrics (for example, the movement of a mouse or other input devices when forming the request), among others.

The resource access system can extract and process the request data from requests to access resources. The processed data can be used to generate feature vectors and determine or generate entity profiles by comparing the various data included with the request to access the resource against data stored in an entity profile database and/or feature vector database. If the resource access system does not identify the entity corresponding to the request (for example, if the request is the first request made by the entity to access the resource), the resource access system can generate a new entity profile corresponding to the entity.

The entity profile can be used by the online subsystem to determine a production model corresponding to the entity. The resource access system can make use of a different production model for each entity. The feature vector can be used as an input to the production model. The production model can produce a trust score corresponding to the feature vector. The trust score is used as the input to a policy engine that determines a resource access policy based on the trust score.

The policy engine can determine a resource access policy based on trust score thresholds. For example, for a high trust score, the policy engine can determine a resource access policy that allows the requesting entity access to the requested resource. For a low trust score, the policy engine can determine a resource access policy that denies the requesting entity access to the resource. For moderate trust scores, the policy engine can perform system level triage, or can alert human analysts in the security operations center subsystem. The human analysts can perform human level triage. The resource access policy can be enforced by the policy engine or in a resource gateway.

The offline subsystem of the resource access system periodically (for example, daily, hourly) trains a number of ensemble classifier models using training data. An ensemble classifier model can be comprised of a combination of submodels that can either be unsupervised or supervised machine learning models. The ensemble classifier models each correspond to an entity profile, and are trained to output a trust score when given a feature vector as an input.

The offline subsystem can store trained ensemble classifier models in a model cache. The model cache can be a database of machine learning models. The offline subsystem can retrieve ensemble classifier models from the model cache and continue to train the ensemble classifier models. During training, the offline subsystem may identify and incorporate additional submodels into the ensemble classifier model training. For example, during a first training, labelled training data (i.e., a combination of feature vectors and trust scores) may not be available, and the ensemble classifier model may comprise an ensemble of unsupervised submodels. At a later time, labelled training data may become available and during a subsequent training the offline subsystem may include additional supervised learning submodels.

Further, the offline subsystem can transmit feature vectors to the security operations center subsystem. Human (or machine) analysts of the security operations center subsystem can determine trust scores associated with the feature vectors and transmit the trust scores back to the offline subsystem. The offline subsystem can receive the trust scores and store them in the trust score database in association with the feature vectors. Alternatively, the offline subsystem can transmit feature vectors and associated trust scores to the security operations center subsystem. Human analysts of the security operations center subsystem can verify that the trust scores given their associated feature vectors. The human analysts can discard or modify ambiguous trust scores or feature vectors. The security operations center subsystem can transmit the verified feature vectors and trust scores back to the offline subsystem. The offline subsystem can store the verified feature vectors and trust scores in their respective databases. These feature vectors and trust scores can be used for future training of ensemble classifier models.

Additionally, the offline subsystem can compare machine learning models to determine the best performing model. The offline subsystem can retrieve models corresponding to the same entity profile from the model cache, and test those models with test data, such as a set of feature vectors with associated trust scores. The offline subsystem can determine the best performing model as the model that produced the most accurate trust scores given the feature vectors as an input. The best performing model can be sent to the online subsystem to be used as the production model.

As an example, the offline subsystem can test an ensemble classifier model (either recently trained or retrieved from the model cache) against the current production model. The offline subsystem can retrieve the production model from the online subsystem. The offline subsystem can test the ensemble classifier model and the production model using test data corresponding to an entity. The offline subsystem can determine a new production model based on the testing, where the new production model is the better performing model of the ensemble classifier model and the production model. The offline subsystem can send the new production model back to the offline subsystem to replace the production model.

Additionally, the offline subsystem can generate, determine, and/or train a model using natural language processing. The resource access system can receive a description of a need or application from a requestor, along with a related dataset. The offline subsystem can parse the description using a natural language processor, and determine a machine learning model in the model cache that best fits the need or application. The offline system can use the related dataset to generate feature vectors that can be used to train the determined machine learning model. The determined machine learning model can be transmitted to the requestor, so that the requestor can use the machine learning model to address their need or application.

Further, the resource access system can categorize APIs and API keys as entities. In this way, the resource access system can be used to determine if use of an API or API key is malicious, and enforce a resource access policy that affects APIs or API keys. For example, a requesting entity can attempt to access a resource stored in a resource database by using an API for that database or for an associated system (such as a resource gateway). The resource access system can determine entity profiles associated with the respective API and API key and determine a feature vector based on request data from the request. The resource access system can then determine the appropriate production models corresponding to the API and API key and apply the feature vectors as inputs to determine trust scores. These trust scores can be used by a policy engine to determine a resource access policy, such as disabling the API or revoking the API key.

Embodiments provide for non-abstract improvements in computer functionality by providing for an improvement in how computers manage access to resources. Computers are frequently employed to manage access to resources, such as sensitive medical records, emails, photos stored on the cloud, etc. By providing for systems that more effectively block fraudulent resource access requests and approve legitimate ones, embodiments provide for an improvement over conventional identity and access management methods and functions performed by conventional computer systems.

For a conventional identity and access management system, the efficacy of the system decreases over time. As malicious entities come to better understand the system, the malicious entities can modify their access requests to exploit loopholes and other flaws in the system. Moreover, because the system is static, the only way these loopholes can be patched is via human intervention. By contrast, embodiments provide for a resource access system that uses dynamic, periodically trained machine learning models to adapt to changes in resource access requests over time. As malicious entities modify resource access requests in order to exploit the resource access system, the resource access system adapts to identify these malicious requests. This provides an advantage over static conventional systems.

Likewise, conventional identity and access management systems are typically designed and tested at fixed points throughout their lifetime. A conventional system can be designed and tested to evaluate its accuracy (for example, the true positive and true negative rate). Once the system meets some baseline criteria (for example, 90% true positive rate), the system is put into production. However, conventional systems provide no mechanism for improving accuracy over time. By contrast, embodiments allow for continual, empirical testing of machine learning models. If the production model ever performs objectively worse than another model, the resource access system can replace the production model with the better performing model. Effectively, the accuracy of the system can continuously improve until the most accurate model is found.

Further, conventional identity and access management systems do not consider differences between the individual entities when evaluating access requests, instead applying the same evaluation rules to all entities equally. In applying identical evaluation rules to non-identical entities, conventional systems often discriminate against some non-malicious entities and fail to identify malicious entities.

For example, a conventional identity and access management system may use evaluation rules to determine if the requesting entity is a human user or a bot, allowing access to human users and denying access to bots. The conventional system may use keystroke data to identify whether the requesting entity is human. However, a particular human entity may use a text-to-speech program to generate resource access requests, and as such, may not produce any keystroke data. This human user may be incorrectly denied access based on the evaluation rules. Alternatively, a bot may falsify keystroke data in order to appear like a human user, and the conventional system may allow the bot to access the resource.

In contrast, embodiments provide different machine learning models for each requesting entity. By using a machine learning model for each requesting entity, the resource access system can account for differences between entities in identifying anomalous or malicious access requests. As a result, the resource access system is able to better identify malicious access requests, without unfairly discriminating against entities by applying a single ruleset to a variety of entities. These are but a few examples of the advantages over conventional identity and access management systems provided by embodiments.

Aspects of embodiments are described in greater detail below, with reference to the figures as necessary.

FIG. 1 shows a system block diagram of an exemplary system 100 comprising a requesting entity 102, a resource access system 104, a resource gateway 106, and a resource database 108.

The requesting entity 102 can be an entity that desires access to a resource, for example, a good, service, or access (for example, the resource may be permission to access a building), among others. For resources that may be stored electronically (such as cryptographic keys or sensitive medical records), the resource may be stored in resource database 108. The requesting entity 102 may be a user, user computer, client computer, shared work station, etc. The requesting entity 102 may also be a user operating a user or client computer, such as a user operating a laptop.

The request to access the resource may be transmitted electronically, via any suitable communication network, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (for example, employing protocols such as, but not limited to a Wireless Application protocol (WAP), I-mode, and/or the like); and/or the like. Messages between the entities, providers, networks, and devices may be transmitted using a secure communications protocol such as, but not limited to, File Transfer Protocol (FTP); Hypertext Transfer Protocol (HTTP); Secure Hypertext Transfer Protocol (HTTPS), Secure Socket Layer (SSL), ISO (for example, ISO 8583) and/or the like.

The requesting entity 102 may communicate the request to access the resource to the resource access system 104 or the resource gateway 106. In some embodiments, the requesting entity may directly communicate with the resource access system 104 or resource gateway 106. For example, the resource gateway 106 could be a computerized gate that controls access to a building, and the requesting entity 102 could submit a request to access the resource (i.e., enter the building) via a keypad on the resource gateway 106.

Resource access system 104 may comprise a number of subsystems, including an online subsystem 104A, an offline subsystem 104B, and a security operations center subsystem 104C. The subsystems 104A-104C may be implemented on one or more computers or computer networks, among other implementations. In some embodiments, multiple subsystem may be implemented on the same computer or computer network.

The online system 104A can comprise a computer or network of computers. The online subsystem 104 can receive requests to access resources, either directly from the requesting entity 102 or from the requesting entity 102 via the resource gateway 106. The online subsystem 104A can generate a feature vector from request data included in the request to access the resource, determine an entity profile corresponding to the requesting entity, determine a production model correspond to the entity profile, produce a trust score using the feature vector as an input to the production model, and analyze the trust score using a policy engine to produce a resource access policy.

In some embodiments, the requested resource can be transmitted to the requesting entity 102 via the online subsystem 104A. For example, the online subsystem 104A can determine a resource access policy that allows the requesting entity access 102 access to the resource. The online subsystem 104A can communicate with the resource database 108 and access the resource. The online subsystem 104A can then transmit the resource back to the requesting entity 102. Alternatively, the online subsystem 104A can allow access to the resource by forwarding communications from the requesting entity 102 to the resource database 108. For example, the requesting entity 102 can make API calls to a resource database API via the online subsystem 104A.

Alternatively, access to the resource database 108 may be mediated by a resource gateway 106. The online subsystem 104A may receive the request to access the resource from the resource gateway 106, determine a resource access policy, then transmit the resource access policy to the resource gateway 106, the resource gateway 106 thereafter implementing the resource access policy (for example, denying access to the resource, allowing access to the resource, etc.)

The offline subsystem 104B can comprise a computer or network of computers. The offline subsystem 104B can perform operations related to training, storing, and testing machine learning models. The offline subsystem 104B can deploy a trained learning model to the online subsystem 104A to be used as the production model in analyzing request to access resources. The offline subsystem 104B can comprise a number of databases, such as a data lake that stores request data, a feature store that stores feature vectors, an entity profile database that stores entity profiles, a trust score database that stores trust scores, and a model cache that stores machine learning models. The offline subsystem 104B can access these databases as part of training and testing machine learning models. For example, the offline subsystem 104B can access a feature vector database and a trust score database, extract associated feature vectors and trust scores, and generate a set of training data using those feature vectors and trust scores, such that the training data can later be used to train machine learning models. The offline subsystem 104B can also communicate with the security operations center subsystem 104C in order to verify the accuracy of feature vectors and trust scores that may be used in training.

The security operations center subsystem 104C can comprise computers, such as monitoring systems (i.e., systems that monitor or visualize one or more aspects of communication between entities or computers, or requests to access resources). The security operations center subsystem 104C may also comprise human analysts that can receive training data, such as trust scores and feature vectors from the offline subsystem 104B, and analyze, verify, or modify the feature vectors or trust scores in order for the feature vectors and trust scores to be more useful and accurate as training data for models trained by the offline subsystem 104B.

Additionally, human analysts of the security operations center 104C can perform human level triage operations as part of implementing a resource access policy determined by the online subsystem 104A. For example, a request to access the resource associated with requesting entity 102 may have a "medium-low" trust score (for example, between 25 and 50 on a 0-100 point scale), the resource access policy could involve the human analysts looking over the request to access the resource and making a decision as to whether the request should be approved or denied. Additionally, the resource access policy may involve the human analysts making contact with the requesting entity 102. For example, the requesting entity 102 may be a user attempting to access their financial information from a resource database 108 associated with a banking or brokerage with which the requesting entity 102 has an account. The resource access policy could involve a human analyst calling the requesting entity 102 at a phone number associated with the requesting entity 102, and verbally confirming that the requesting entity 102, and not a fraudulent or malicious user, is attempting to access the financial information.

The resource gateway 106 can be a computer or server computer that mediates the requesting entity's 102 access to resources, or services requests to access resources, such as resources in the resource database 108. In some embodiments, the resource gateway 106 can have an associated API through which a requesting entity 102 can make API calls in order to access resources in the resource database 108.

The resource gateway 106 can communicate requests to access resources, along with any associated request data to the resource access system 104, which can analyze the requests and determine a resource access policy as described above. The resource gateway 106 may receive the resource access policy from the resource access system and implement the resource access policy. For example, a resource access policy may deny access to the resource via blacklisting an IP address or range of IP addresses associated with requesting entity 102. The resource gateway 106 may implement the IP blacklisting, and may ignore subsequent communications from the requesting entity 102. For example, in a Linux system, using the "iptables" utility program to configure Linux kernel firewall rules in order to prevent communication from the requesting entity 102.

In some embodiments, the resource access gateway 106 may be integrated into the resource access system 104. Alternatively, the resource access system 104 may service resource access requests itself, and the resource access gateway 106 may be optional.

The resource access database 108 can be any appropriate data structure for storing digital resources, such as cryptographic keys, or sensitive digital records such as financial account numbers, personally identifying information, and the like. The resource access database 108 may store such digital resources in encrypted or unencrypted form. The resource access database 108 may be accessed by the resource access system 104 or the resource gateway 106 through appropriate access means, such as database querying (for example, SQL queries). In some embodiments, the resource database 108 may be implemented on a standalone computer or server computer, in others, the resource database 108 may be implemented on a computer that also implements the resource gateway 106, or one or more subsystems of the resource access system 104.

In some embodiments, the resource access system 104 and resource gateway 106 mediate access to one or more resources that cannot be stored or represented in digital form. In these embodiments, the resource database 108 serves as a placeholder for a structure that contains the one or more resources. For example, the resource could be food rations stored in a secure computerized container that is deployed as part of humanitarian aid. The resource access system 104 could analyze requests to access the food rations, and determine if those requests were legitimate (for example, the requesting entity 102 has not yet received their food rations for the day) or malicious (for example, the requesting entity 102 is attempting to steal the food rations of others). As another example, the resource could be access to a building such as an apartment complex. In either case, the resource cannot be stored in a resource database 108. As such, in some embodiments, the resource database 108 is optional.

Figure 2:
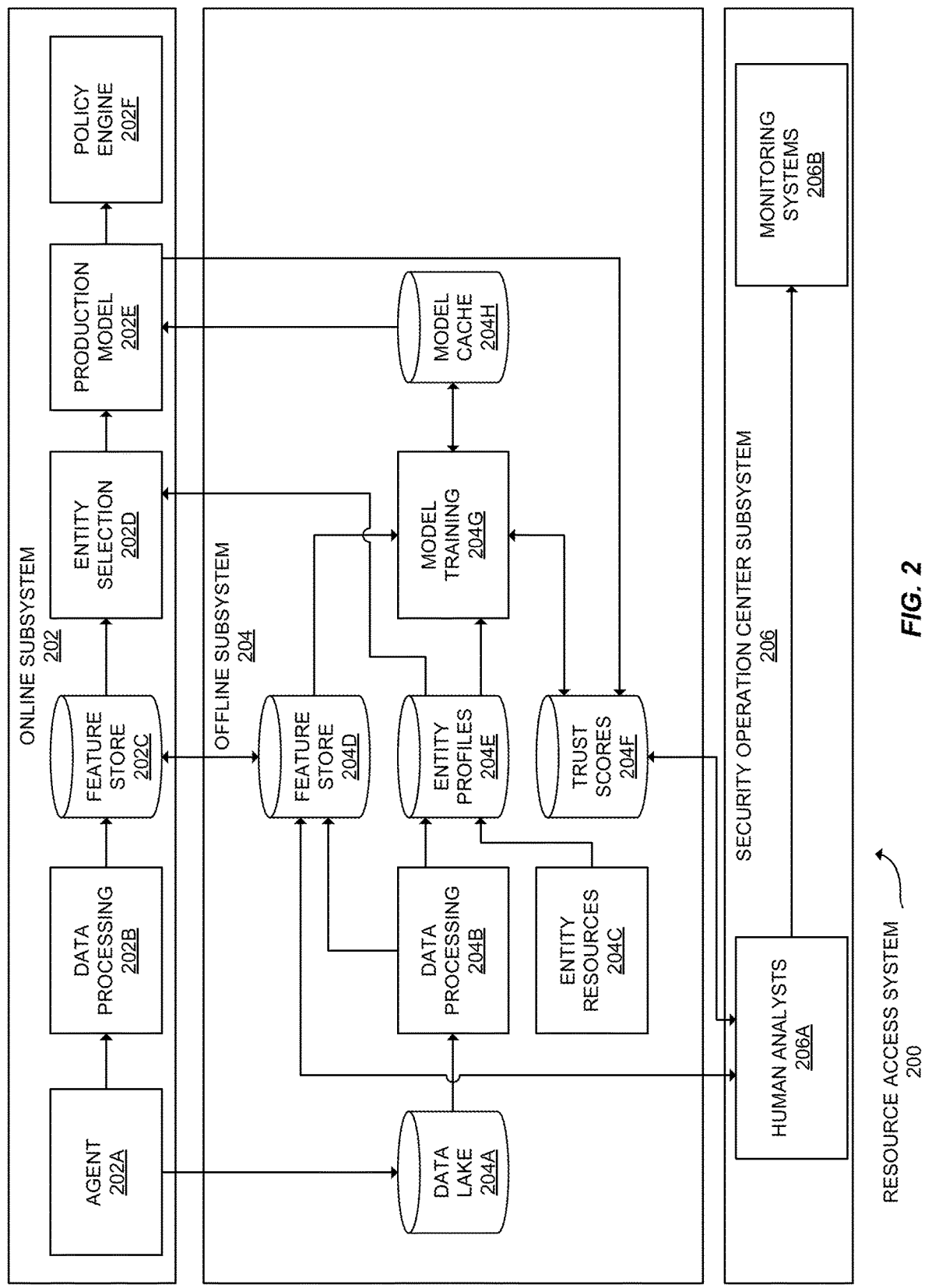
FIG. 2 shows a block diagram of an exemplary resource access system and its subsystems according to some embodiments.

FIG. 2 shows a diagram of a resource access system 200 comprising an online subsystem 202, an offline subsystem 204, and a security operations center subsystem 206, as well as components that comprise the abovementioned subsystems.

The online subsystem comprises an agent 202A, a data processing element 202B, a feature store 202C (also referred to as a "feature vector database") an entity selection element 202D, a production model 202E, and a policy engine 202F.

The agent 202A can comprise software or specialized hardware that receives and/or handles requests to access resources. The agent 202A directs the flow of requests and associated request to a data lake 204A of the offline subsystem 204 and the data processing element 202B of the online subsystem 202. In some embodiments, the agent 202A can also mediate outgoing communications with a resource gateway or requesting entity, such as transmitting a resource access policy to a resource gateway, or transmitting a requested resource to a requesting entity.

The data processing element 202B can comprise software or specialized hardware that performs initial data processing of request data. This may include generating feature vectors from request data that can be used as the input to a production model, and storing generated feature vectors in feature store 202C.

As described above, a feature vector is a vector representation of features deemed relevant for a particular machine learning application. For example, for a machine learning application that evaluates entity behavior, features may include whether an input credential was correct, how the entity input the credential or formulated the request to access the resource (for example, by using a mouse, keyboard, or other input peripheral), and the time at which the request was made, among others. The data processing element 202B can process these identified features in order to produce a numerical representation of the features, for example, mapping mouse input to the value "2" or keyboard input to the value "3." Further, the data processing element 202B can normalize the numerical values, either relative to the feature vector or relative to a data set. The data processing element 202B can process the request data by remapping the feature to a different range, such as 0-1, or by removing the unit of a given feature so that it can be compared to other features with different units. Additionally, the data processing element 202B can normalize a feature vector, such that it has unit length, or such that the collection of features in the feature vector have a particular mean and/or standard deviation. Once the data processing element 202B has generated the feature vector, the data processing element 202B can transmit the feature vector to feature store 202C.

Feature store 202C can be a database or other appropriate data storage structure that can store feature vectors. Additionally, feature store 202C can communicate with feature store 204D of the offline subsystem 204, such that the feature vector generated by the data processing element 202B can be used by the offline subsystem 204 to train other machine learning models. Feature store 202C can further transmit the generated feature vector to the entity selection element 202D The entity selection element 202D can determine an entity profile associated with the feature vector. As described above, entity profiles are collections of data that describe and or identify particular entities. The entity selection element 202D can communicate with the entity profile database 204E of offline subsystem 204. By analyzing the feature vector, the entity selection element 202D can determine the entity profile corresponding to the feature vector, and by extension the requesting entity.

As an example, a feature vector could contain elements corresponding to a unique credential, such as a username and password associated with the requesting entity. The entity selection element 202D can query the entity profile database 204E to determine an entity corresponding to the credential and retrieve the entity profile. As another example, the feature vector could contain data relating to mouse movements involved in generating the request to access a resource, such as how fast the requesting entity moved the mouse, how far the requesting entity overshot, how long it took for the requesting entity to click on a particular element, etc. These features can also be used to identify the requesting entity, as different entities can use input peripherals in different, quantifiable ways.

Further, the entity selection element 202D can compare different features to identify irregularities. For example, the requesting entity may have provided a credential corresponding to entity A, but their mouse movements may be highly characteristic of entity B. In this way, the entity selection element 202D can infer that entity B may have stolen entity A's credential. This inference may be provided to the policy engine 202F and may be used as part of determining a resource access policy. The entity selection element 202D can determine the production model 202E corresponding to the entity profile. Further the entity selection element 202D can input the feature vector into the production model 202E.

The production model 202E can produce a trust score corresponding to the feature vector. The trust score can be a measure of the normality or abnormality of the request to access the resource, or alternatively, a measure of the maliciousness or non-maliciousness of the request. For example, on a 0-100 scale, a trust score of 100 can correspond to complete trust, indicating that the request to access the resource is completely normal or completely benign, and a trust score of zero can correspond to a completely abnormal or completely malicious request. As such, the production model is able to determine the trust score corresponding to the input feature vector based on knowledge accrued through training.

The trust score output by the production model can be transmitted to trust score database 204F in offline subsystem 204, such that offline subsystem 204 can use the trust score in order to train other machine learning models. Further, the trust score can be sent to policy engine 202F.

Policy engine 202F can determine a resource access policy based on the trust score. The resource access policy controls the requesting entity's access to the resource. For example, for a trust score of zero, the policy engine 202F may determine a resource access policy that blocks the requesting entities ability to acquire the requested resource, such as changing firewall options to blacklist the requesting entity. In cases where the requesting entity is an API key used in conjunction with an API entity, the resource access policy could involve revoking the API key, such that the entity using the requesting entity API key is no longer able to utilize the API in order to attempt to access resources. The policy engine 202F can be better understood with reference to FIG. 3.

Figure 3:
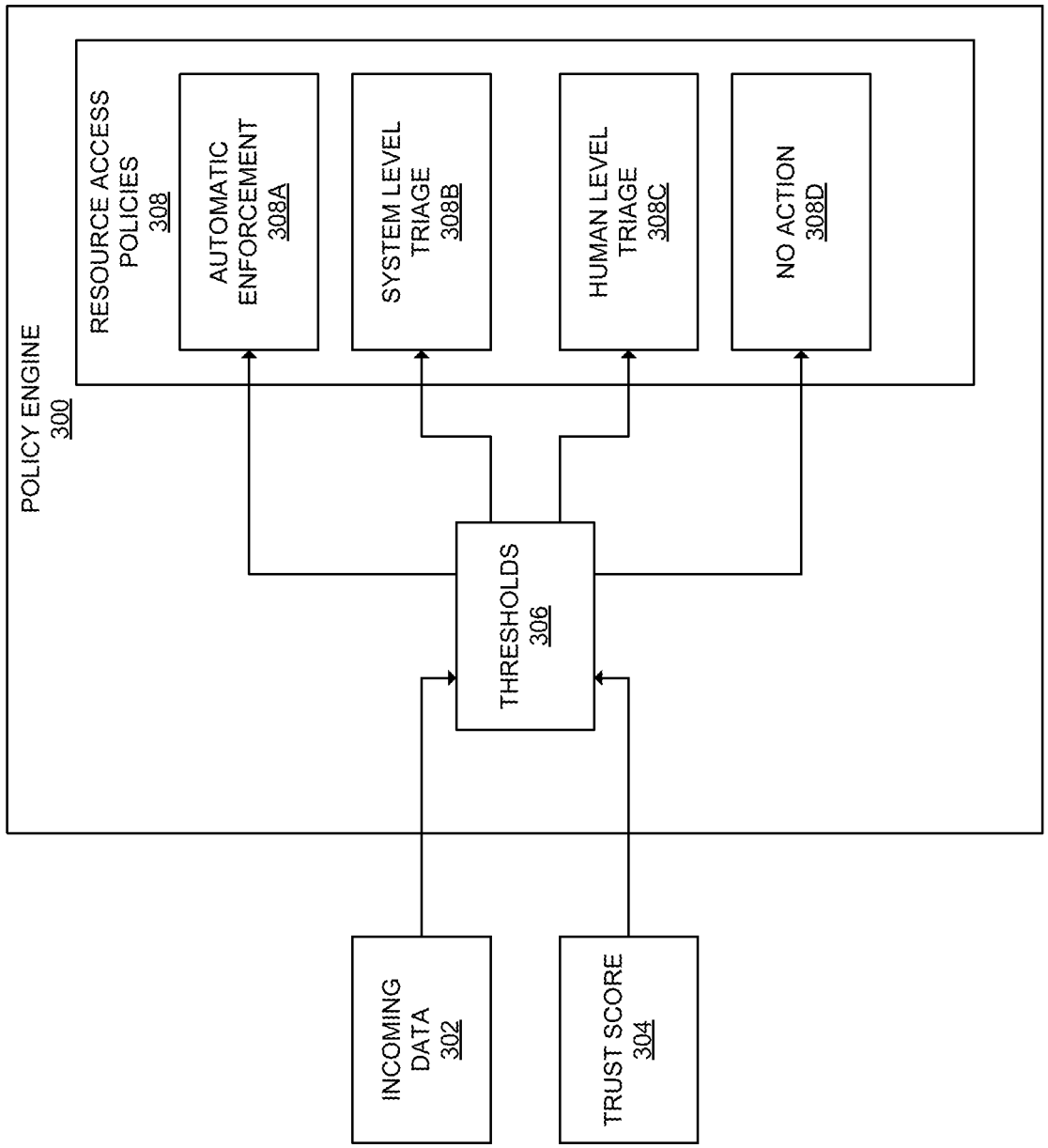
FIG. 3 shows a block diagram of an exemplary policy engine according to some embodiments.

FIG. 3 shows a policy engine 300, incoming data 302, trust score 304, thresholds 306, and a resource access policy list 308. The resource access policy list includes several example resource access policies, such as an automatic enforcement resource access policy 308A, a system level triage resource access policy 308B, a human level triage resource access policy 308C, and a no action resource access policy 308D.

In FIG. 3, the policy engine receives incoming data 302 and the trust score 304 determined by the production model (i.e., production model 202E from FIG. 2). The policy engine 300 can compare the trust score against thresholds 306 in order to select a resource access policy from the list of resource access policies 308. It should be noted that this is one exemplary resource policy engine 300 and methodology, and that other methods can be used to determine an appropriate resource access policy based on incoming data 302 and trust score 304.

The incoming data 302 can comprise data used by the policy engine 300 in order to inform the selection of a resource access policy. This can include raw or processed request data included or associated with the request to access the resource. It can also include other data generated or determined by any of the modules or elements of the online subsystem. For example, as described above, the entity determination element of the online subsystem could determine that while some features of the feature vector correspond to a particular entity profile (for example, the credential included in the request data matches an entity A), other features of the feature vector correspond to a different entity profile (such as behavior patterns that correspond to entity B). The incoming data 302 could comprise some message or indication generated by the entity determination element that entity B may be using the credential of entity A in order to access resources.

As one example, the policy engine 300 can directly compare the received trust score 304 against one or more predetermined thresholds 306. For example, for trust scores ranging from 0-100, the policy engine 300 can have 4 predetermined thresholds 306, such as 0, 25, 50, and 75. The policy engine 300 can compare the trust score 304 against the predetermined thresholds 306 to determined one or more exceeded thresholds. For example, a trust score 304 equal to 53 exceeds the 0, 25, and 50 threshold. The policy engine 300 can determine a maximum exceeded threshold, for the example above, 50. The policy engine 300 can then determine a resource access policy from the resource access policies list 308 based on the maximum exceeded threshold. For example, the automatic enforcement policy 308A could correspond to the 0 threshold, the system level triage policy 308B could correspond to the 25 threshold, the human level triage policy 308C could correspond to the 50 threshold and the no action policy 308D could correspond to the 75 threshold.

For the example above, as the maximum exceeded threshold is 50, the policy engine 300 can select the human level triage policy 308C from the resource access policy list 308. The policy engine 300 can transmit the human level triage policy to human analysts of the security operations subsystem (i.e., security operations subsystem 206 from FIG. 2), and the human analysts can take the necessary steps to enact the policy, such as contacting the requesting entity and requesting additional information or referring to the request data, feature vector, and trust score and determining whether the resource access request is malicious or not.

The automatic enforcement resource access policy 308A can comprise actions performed by the resource access system or a resource access gateway to automatically enforce a policy, such as blocking access to the resource and revoking a credential associated with resource access.

The system level triage policy 308B can involve either the resource access system or the resource access gateway performing steps in order to further evaluate the resource access request, such as transmitting an automated reply to the requesting entity for additional information (for example, requesting a response to a security question, or requesting a biometric, such as a thumb print or retina scan). The resource access system can further evaluate the additional information and make another policy decision based on the information, such as allowing access to the resource. Alternatively, the additional information can be used along with the original request information to generate a new feature vector that can be used to determine a new trust score that can be re-evaluated using the policy engine 300.

The human level triage policy 308C, can involve a human analyst evaluating the request to access the resource and making a determination, such as allowing or denying access to the resource. Additionally or alternatively, the human level triage policy 308C can involve the human analyst making contact with the requesting entity in order to determine if the request to access the resource is legitimate. For example, a requesting entity could request a large amount of money (resource) from an ATM machine. A resource access system associated with the ATM machine could generate a feature vector, determine an entity profile, determine a trust score, and determine a human level triage policy 308C corresponding to the request. A human analyst associated with the requesting entity's bank could call a phone number associated with the determined entity profile, and ask the entity whether they are attempting to use an ATM machine to withdraw large amounts of money. Based on their response, the human analyst could either approve the request or deny the request.

The no action policy 308D can be a resource access policy where the resource access system takes no action to prevent the requesting entity from accessing the request resource, allowing the requesting entity to access the requested resource. The no action policy 308D can be reserved for cases with high trust scores.

Notably the predetermined thresholds listed above (i.e., 0, 25, 50, and 75, for trust scores on a 0-100 scale) are non-restrictive examples of thresholds 306, the thresholds 306 corresponding to each policy could take on any appropriate value, and any number of appropriate thresholds can exist. Additionally, the policy engine 300 can use the incoming data 302 to modify the thresholds 306. For example, incoming data that indicates that one known entity may be attempting to impersonate another known entity may increase the threshold corresponding to the no action resource access policy 308D (for example, from 75 to 90). Additionally, the incoming data 302 can be used to determine a reduction in the incoming trust score 304 before it is compared to the thresholds 306 (for example, in the suspected impersonation example, trust score 304 could be reduced by 10 before being compared to thresholds 306). Alternatively, the policy engine 300 may not use thresholds at all, and may employ another method, such as conditional logic in order to determine a resource access policy from the resource access policies list 308. As another alternative, the policy engine 300 could employ another machine learning model that takes in a trust score as an input and produces a resource access policy as an output. The resource access policies listed above are non-limiting examples, and the resource access policies list 308 could comprise any number of appropriate resource access policies.

Figure 4:
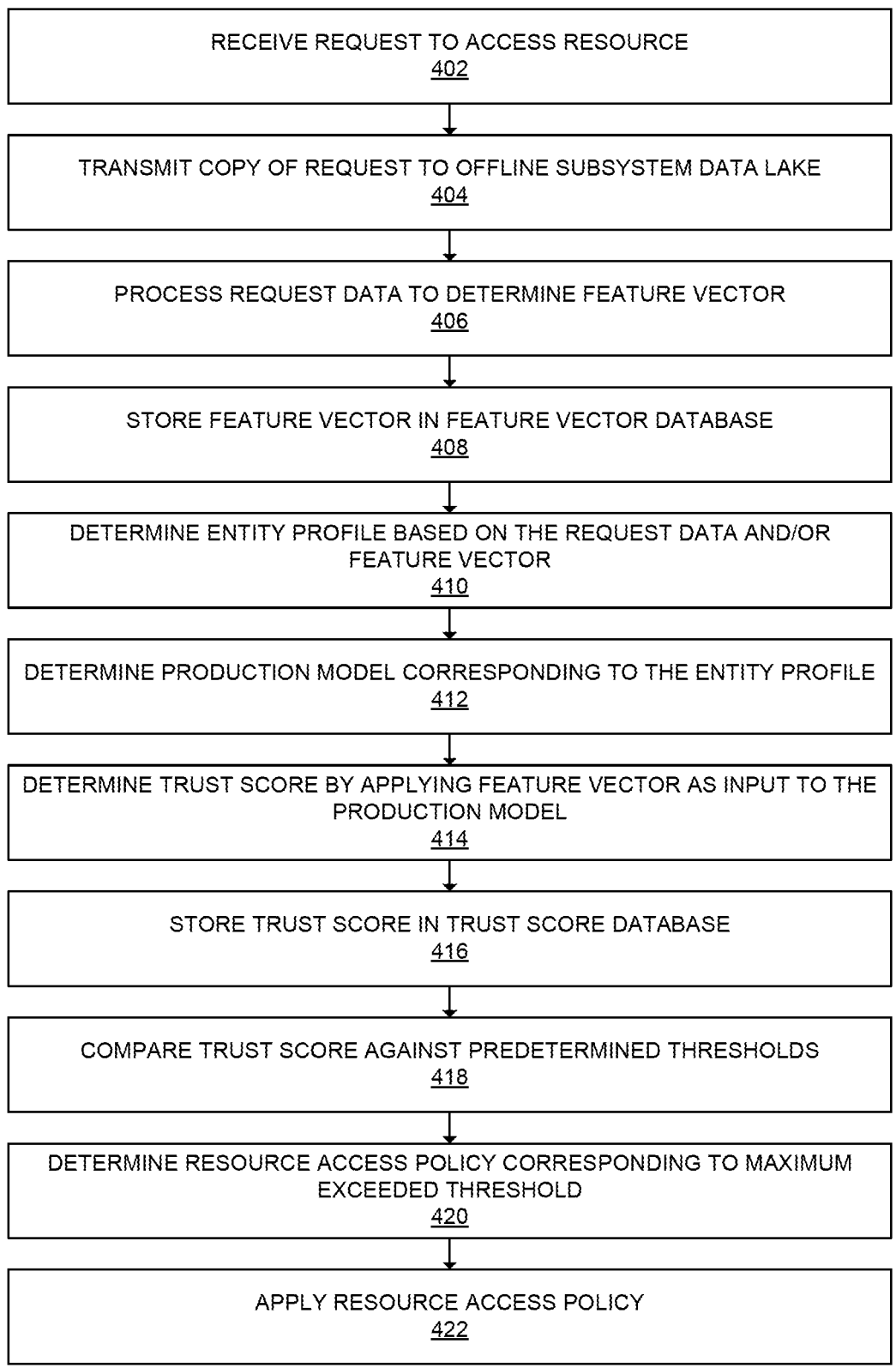
FIG. 4 shows a flow chart of an exemplary method for processing a request to access a resource according to some embodiments.

FIG. 4 shows a flowchart of an exemplary method 400 performed by the online subsystem in order to evaluate a request to access a resource and produce a resource access policy.

At step 402, the resource access system can receives a request to access a resource. The request to access the resource can be received from a requesting entity either directly, or via an intermediary, for example, a communications network such as the Internet, or a resource gateway. The request to access the resource may include request data, such as a credential used to identify or authenticate the requesting entity (for example, a username and password), the time the request was made, the location the request originated from (either geographical or relative to a computer network, such as an IP address), data relating to a computer system that generated the request (for example, whether the requesting entity made the request via a laptop or a smartphone), whether or not there is a human user associated with the requesting entity, and input characteristics (for example, keystroke rates), among others At step 404, the resource access system can transmit the request data to the offline subsystem data lake. The offline subsystem can store the request data in the data lake before processing it to generate feature vectors and determine entity profiles as part of the training procedure.

At step 406, the resource access system can process the request data to determine a feature vector. This can be accomplished with a data processing element or module, such as data processing element 202B from FIG. 2, and as described above, may involve identifying features in the request data, processing the features in order to produce numerical representations of the features, and normalizing the feature vector.

At step 408, the resource access system can store the feature vector in a feature vector database, such as the feature store 202C, or feature store 204D from FIG. 2. Once the entity profile is determined, the stored feature vector can be updated, such that the feature vector is stored in the feature vector database in association with the entity profile.

At step 410, the resource access system can determine, based on the request data and/or the feature vector, an entity profile associated with the requesting entity. As described above, the online subsystem may comprise an entity selection element (for example, entity selection element 202D from FIG. 2) that determines an entity profile associated with the feature vector. The entity selection element can access an entity profile database in order to determine the entity profile associated with the feature vector, and can use one or more features from the feature vector as queries or inputs to the entity profile database in order to produce the corresponding entity profile. As an example, the feature vector may contain one or more features that are uniquely or directly associated with an entity profile. For example, a feature such as a username and password may be uniquely associated with an entity profile. The resource access system could determine the entity profile based on the username and password features alone. Alternatively, the resource access system can consider all features in the feature vector when determining an entity profile. For example, the resource access system could determine clusters of feature vectors corresponding to each entity profile, and compare the feature vector against the clusters to determine an entity profile based on the feature vector.

At step 412, the resource access system can determine a production model corresponding to the entity profile. As described above, the resource access system can maintain machine learning models corresponding to each entity profile stored in an entity profile database, such that the resource access system can evaluate resource access requests on an individual entity basis. The production models can be stored in a model database, such as a model cache, and the online subsystem can determine a production model corresponding to the entity profile. For example, by searching or querying the model cache using the entity profile as the input or search argument.

At step 414, the resource access system can determine a trust score by applying the feature vector as an input to the production model. The trust score can be used by the resource access system to determine whether the request is malicious or benign. For example, a feature vector can include features such as a username and password, as well as other features, such as mouse movement data, keystroke rates, etc. The resource access system may have determined the entity profile based on the username and password features alone, but may determine the trust score based on the entire collection of features. For example, the username and password may correspond to entity A, but none of the other features correspond to entity A. As such, there is a high risk that entity A is being impersonated by a malicious entity, and the output trust score may be low as a result.

At step 418, the resource access system can store the trust score in a trust score database in association with the entity profile, such as trust score database 204F from FIG. 2. The trust score can be used by the offline subsystem in order to train other machine learning models.

At step 418, the resource access system, via the policy engine of the online subsystem, can compare the trust scores against predetermined thresholds. This can be accomplished using a procedure such as the procedure outlined with reference to FIG. 3. For example, the resource access system determines one or more exceeded thresholds by comparing the trust score against one or more predetermined thresholds, then determines a maximum exceeded threshold, wherein the maximum exceeded threshold is a threshold with a maximum threshold value of the one or more exceeded thresholds.

At step 420, the resource access system, using the policy engine, can determine a resource access policy corresponding to the maximum exceeded threshold. As described with reference to FIG. 3, the policy engine can have a list of resource access policies mapped to each of the predetermined thresholds, and the policy engine can select the resource access policy corresponding to the maximum exceeded threshold.

At step 422, the resource access system can apply the resource access policy. As described above, application of the resource access policy can take many forms. As one example, the resource access system can apply the resource access policy by transmitting the resource access policy to a resource gateway, such that the resource gateway implements the resource access policy, for example, by using applying firewall or iptable rules in order to block or allow access to the resource.

Returning to FIG. 2, the offline subsystem 204 and security operations subsystem 206 will be now be described. The offline subsystem 204 comprises a data lake 204A, data processing element 204B, entity resources element 204C, feature store 204D, entity profile database 204E, trust score database 204F, model training element 204G, and model cache 204H. The security operations subsystem 206 comprises human analysts 206A and monitoring systems 206B.

The data lake 204A can be a database or other repository for raw or minimally processed data, such as a database of request data. The data lake 204A can receive request data from the agent 202A of the online subsystem 204. The data lake 204A can store the request data until it can be processed to determine feature vectors that can be used as training data.

The data processing element 204B can retrieve request data from the data lake 204A. The data processing element 204B can perform operations similar to the data processing element 202B of the online subsystem 202, i.e., processing the request data in order to generate a feature vector, and storing the feature vector in a feature database, such as feature store 204D. Additionally, the data processing element 204B can also use the generated feature vector to determine an entity profile, much like entity selection element 202D.

The entity resources element 204C comprises software, hardware, and databases that can be used in conjunction with data processing element 204B in order to generate entity profiles for new entities. The entity resource element 204C can be in communication with external identity and access management systems, third parties (for example, social networks), in addition to a resource gateway. The entity resource element 204C can collect data from these systems that can be used to generate an entity profile.

As an example, a new requesting entity submits a request to access the resource. The request data can include a credential, such as a username and password. The entity resource element 204C can search the external systems in order to determine if those systems have an entity corresponding to the included credential. For example, whether or not a social media profile exists with the same username, or whether the identity and access management system knows of an entity with that username. If the entity resource element 204C identifies a matching entity, it can extract the data associated with the matching entity, and use that information in order to generate an entity profile. For example, the identified social media account may have information about the entity, such as an email address, age of the entity, location, job title, etc. The entity resource element 204C can generate an entity profile from this information.

The feature store 204D can be a database that stores feature vectors in association with entity profiles and trust scores. The feature store 204D can be populated by feature vectors generated by data processing elements 202B, 204B, and feature vectors retrieved from feature store 202C. Additionally, feature store 204D can be accessed by human analysts 206A of the security operations center 206. Human analysts 206A can add, remove, or modify database entries corresponding to one or more feature vectors stored in feature store 204D. Additionally, feature vectors stored in feature store 204D can be access by model training element 204G in order to train machine learning models, and also by the offline system 204 to test and compare machine learning models.

The entity profile database 204E can be a database that stores entity profiles. These entity profiles can be generated by the data processing element 204B, and the entity resources element 204C. As described above, entity profiles can include data about an entity, such as an identifier, a geographic location, relative network location, other associated entities, etc. The entity profile database 204E can be accessed by model training element 204G in order to train a machine learning model associated with a particular entity profile.

The trust score database 204F can be a database or other appropriate data structure that stores trust scores in association with entity profiles and feature vectors. The stored trust scores can be used by the model training element 204G as training data to train machine learning models. The trust score database 204F can receive trust scores from the production model 202E and model training element 204G. Additionally, the trust score database can be accessed by human analysts 206A of the security operations center 206. Human analysts 206A can verify that trust scores associated with feature vectors are accurate, and can add, delete, or modify trust scores in the trust score database 204F.

The model training element 204G can include software or hardware that can train machine learning models using feature vectors, entity profiles and trust scores retrieved from feature store 204D, entity profile database 204E, and trust score database 204F respectively. The model training element 204G can also retrieve trained models stored in the model cache 204H and continue to train or retrain the retrieved models.

The model training element 204G can maintain a list, database, or repository of analytical model types. These analytical model types can define or categorize different types or families of machine learning models. For example, support vector machines, k-means cluster, logistic regression, among others. Alternatively, the model training element 204G can access the analytical model types from the model cache 204H. Further, the model training element 204G can determine hyperparameters associated with given analytical model types. For example, kernel configurations for a support vector machine. The model training element 204G can perform a hyperparameter search to determine a number of submodels for a given analytical model type, train those submodels using training data and determine the best performing submodels. The model training element 204G can form an ensemble classifier model corresponding to an entity profile as an ensemble of the best performing submodels, and store the resulting ensemble classifier model in the model cache 204H.

The model cache 204H can be a database or other suitable repository of machine learning models, including ensemble classifier models trained by model training element 204G. Further, the model cache 204H can be used by the offline subsystem to promote a model stored in the model cache to be the production model 202E.

Additionally, the offline subsystem 204 can access the model cache 204H in order to compare models against one another. The offline subsystem 204 can access feature vectors stored in the feature store 204D and trust scores stored in the trust score database 204F. The offline subsystem 204 can generate a set of test data comprising these feature vectors and trust scores. The offline subsystem can select one or more models from the model cache and apply the feature vectors as inputs to these models, then compare the results against the corresponding trust scores. The offline subsystem can determine the tested model with the highest accuracy, or conversely, the lowest error rate as the best performing model, and the best performing model can be promoted to be the production model 202E.

Further, the offline subsystem 204 can receive a machine learning model request from a machine learning model requestor through, for example, the agent 202A. The machine learning model requestor can be an entity that desires a machine learning model for some purpose. The offline subsystem 204 can use natural language processing to evaluate the machine learning model request. The offline subsystem 204 can determine a machine learning model in the model cache 204H that can be used for the requestor's purpose, and can train the determined machine learning model using model training element 204. The offline subsystem can transmit the requested model back to the machine learning model requestor through, for example, the agent 202A.

Figure 5:
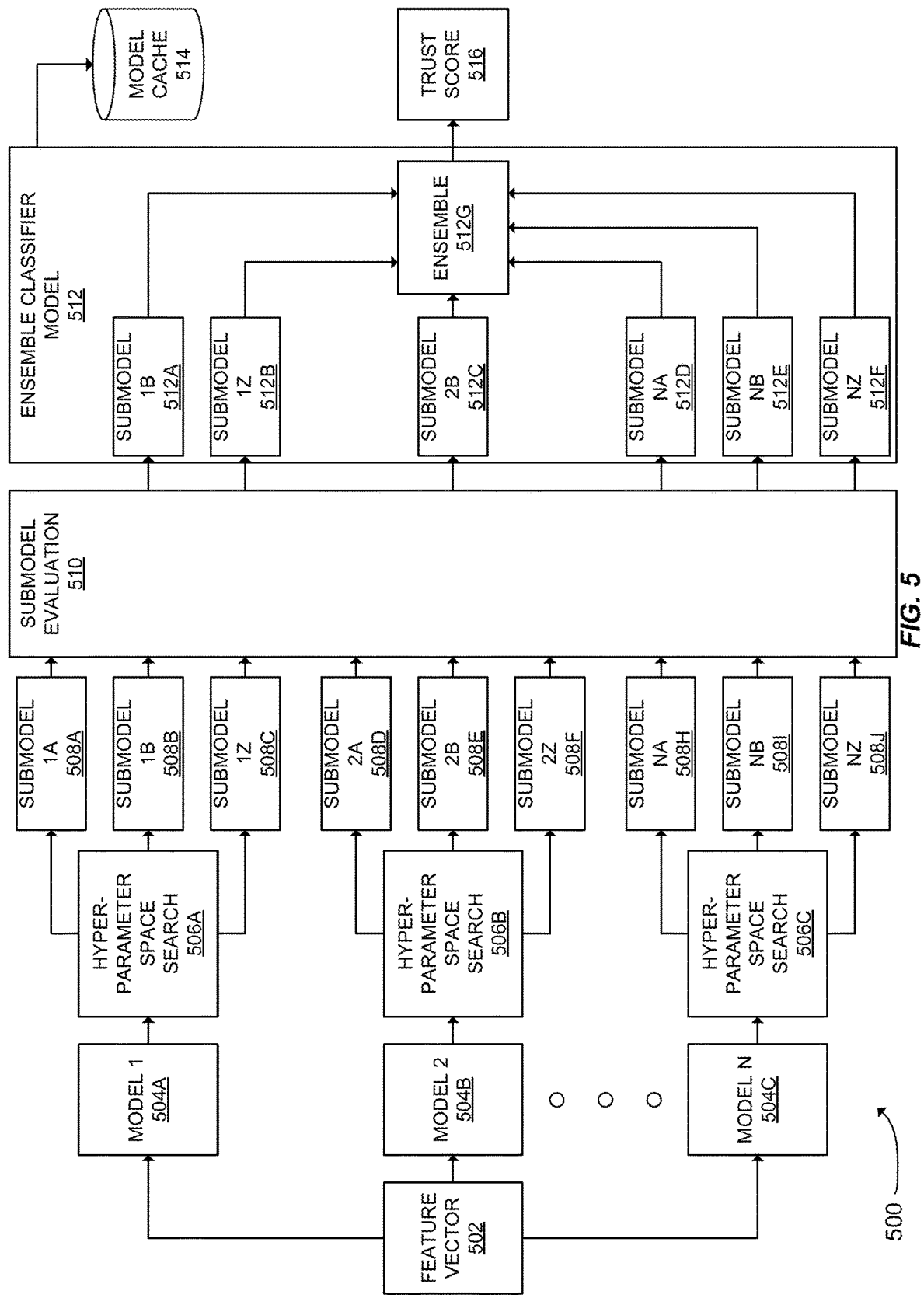
FIG. 5 shows a block flow diagram of an exemplary method for training an ensemble classifier model according to some embodiments.

FIG. 5 shows a branching flow diagram 500 of the training process for an ensemble classifier model 512. The diagram shows feature vectors 502, three models or analytical model types 504A-504C, three hyperparameter space searches 506A-506C, nine submodels 508A-508J, and a submodel evaluation 510. The ensemble classifier model 512 comprises six best performing submodels 512A-512F, and an ensemble 512G. Although six best performing submodels are shown, the ensemble classifier model could comprise more or less submodels. Additionally shown are a model cache 514 and a trust score 516.

A feature vector 502 can be used as the input to a trained ensemble classifier model 512 in order to produce a trust score 516. Additionally, a collection of feature vectors 502 and trust scores can be used as training data in order to train the ensemble classifier model 512. The feature vectors 502 can be retrieved from a feature vector database.

Models 504A-504C can be analytical model types (for example, support vector machine, long short-term memory, recurrent neural network, etc.). As part of training, the offline subsystem can use these analytical model types to determine a plurality of submodels (i.e., submodels 508A-508J) each differing by one or more hyperparameters. Although only three analytical model types are shown, the offline subsystem may use more analytical model types in training an ensemble classifier.

The hyperparameter search spaces 506A-506C describe all possible values that hyperparameters for a given analytical model type can take. For example, the analytical model LASSO (least absolute shrinkage and selection operator) has a shrinkage or regularization hyperparameter that can be set to any real value between 0 and infinity. Thus the hyperparameter search space for LASSO is any value that the shrinkage hyperparameter can take. Alternatively, an abstract example analytical model could have hyperparameters A and B. The hyperparameter search space for the abstract example analytical model is all combinations of values of A and B.

Hyperparameter searching can be accomplished in a number of ways. One such example is a grid search, a search of a manually specified subset of the hyperparameter space of a given analytical model type. For example, for the above abstract analytical model type, the subset of A could be {1, 2} and the subsystem of B could be {5, 10}. This leads to four paired {A, B} values {1, 5}, {1, 10}, {2, 5}, and {2, 10}. For the grid search, the offline subsystem can train a submodel of the analytical model type for each hyperparameter pair using the same set of training data. For example, if model 1 504A is the abstract analytical model type with hyperparameters A and B, the hyperparameter search space 506A could be reduced with grid search to the four sets of hyperparameters described above. Using feature vectors 502 and trust scores, the offline subsystem can train four submodels, each using a different hyperparameter pair of the hyperparameter pairs above ({1, 5}, {1, 10}, {2, 5}, {2, 10}), for example, submodels 508A-508C and a fourth submodel not shown. Grid search is a single, non-limiting hyperparameter search example, the offline subsystem could use other appropriate hyperparameter search methods, such as random search, Bayesian search, gradient based search, and the like.

Once the offline subsystem has performed hyperparameter searching and generated and trained a plurality of submodels 508A-508J for each analytical model type 504A-504C, the offline subsystem can perform submodel evaluation 510 in order to determine the best performing submodels to select for the ensemble classifier model. Although there are many appropriate methods of submodel evaluation, an exemplary multi-armed bandit evaluation will be explained for the purpose of illustration.

A multi-armed bandit evaluation of submodels involves randomly selecting and testing submodels with some probability. A selected submodel is tested with some input, for example, a feature vector, and the output of the submodel, a trust score, is compared against a known or expected output. For example, the offline subsystem could extract a set of feature vectors and their associated trust scores from the feature vector and trust score database, apply one or more feature vectors as the input of the selected submodel and compare the resulting output against the associated trust scores. The payout associated with selecting a given submodel is equal to the accuracy of the submodel's output trust score. The goal of the multi-armed bandit evaluation is to determine the submodels that maximize the payout, i.e., maximize the accuracy of prediction. This can involve an "exploration phase," during which the offline subsystem selects and tests each submodel 508A-508J in turn to produce some estimate of the expected payout for each submodel.

The accuracy of a submodel can be calculated based on the difference between the submodels output and an expected output. For example, five feature vectors may have corresponding trust scores {10, 84, 37, 32, 41}. These trust scores may have been determined by human analysts of the security operations center subsystem or another machine learning model. The feature vectors can be applied to a submodel being testing. As an example, the resulting output trust scores could be {9, 90, 30, 40, 40}. The accuracy of the submodel can be determined based on the difference between the expected trust scores and the output trust scores.

The difference between the above expected and example trust scores is (1, −6, 7, −8, 1). As an example, the error of the submodel could be represented by the root mean square of the difference, i.e., $\sqrt{1^2 + -6^2 + 7^2 + -8^2 + 1^2} = 12.29$. The accuracy, corresponding to the payout of the submodel could be the inverse of the error, i.e., 0.08 for the above example. A submodel that produces trust scores that are closer to the expected trust scores will produce a lower root mean square error and thus a higher accuracy and payout.

Afterwards, the multi-armed bandit evaluation can involve randomly selecting submodels with different probability, then adjusting the selection probability for each submodel given the result of the test. For example, for a limited system comprising two submodels A and B, the offline system can test each submodel and determine an initial expected payout. For example, submodel A classifies the test data with 80% accuracy, and submodel B classifies the test data with 60% accuracy. As the payout (accuracy) of submodel A is higher than the payout of submodel B, the offline subsystem could assign a higher selection probability to submodel A than submodel B, for example, 57% for submodel A, and 43% for submodel B.

The offline subsystem can repeatedly and randomly select submodels A and B and test them. If a submodel underperforms, its selection probability is reduced, if it over performs, its selection probability is increased.

For a system comprising a large number of submodels, after repeated testing, the submodels can be ordered by selection probability. A collection of submodels with the highest selection probability (for example, 6 submodels) can be selected to be included in the ensemble classifier model 512.

Once the best performing submodels are determined, the offline subsystem can generate an ensemble classifier model 512 comprising the best performing submodels 512A-512F and ensemble 512G. The ensemble 512G is a combination of outputs of the submodels forming the ensemble classifier model 512. For example, the ensemble 512G can be a weighted average of the outputs of each individual submodel 512A-512F.

Further, if the ensemble 512G comprises a weighted average, the offline subsystem can perform a process to determine the optimal weighting distribution. The weighting distribution could be determined based on the submodel evaluation 510, for example, the best performing submodel of submodels 512A-512F can be assigned the greatest weight, and the worst performing submodel of submodels 512A-512F could be assigned the least weight. As another alternative, the offline subsystem can perform some iterative process to determine the weights, for example, evaluate the ensemble classifier model 512 using test data for different combinations of weights to determine the optimal combination of weights.

The offline subsystem can store ensemble classifier model 512 in the model cache 514. The ensemble classifier model 512 can be used to output a trust score 516, for example, if the ensemble classifier model 512 is used as the production model in the online subsystem.

Figure 6:
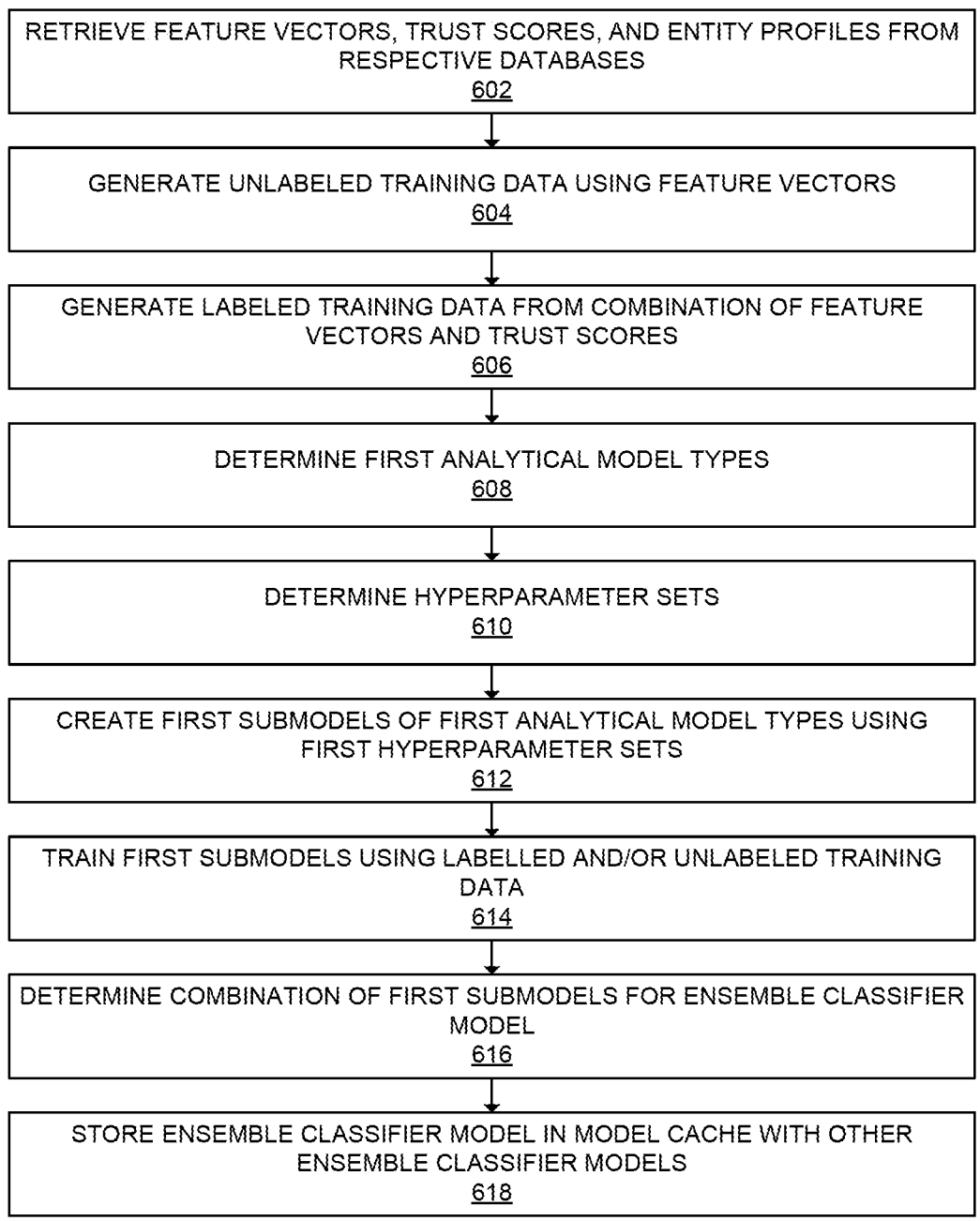
FIG. 6 shows a flow chart of an exemplary method for training an ensemble classifier model according to some embodiments.

FIG. 6 shows a method 600 for training an ensemble classifier model according to some embodiments.

At step 602, the resource access system can retrieve feature vectors, trust scores, and an entity profile from their respective databases, for example, using the offline subsystem as described above.

At step 604, the resource access system can generate unlabeled training data using feature vectors corresponding to a particular entity. The unlabeled training data can be used to train submodels of unsupervised analytical model types.

At step 606, the resource access system can generate labeled training data from a combination of feature vectors and corresponding trust scores. The labeled training data can be used to train submodels of supervised analytical model types.

At step 608, the resource access system can determine a plurality of first analytical model types, such as analytical model types 504A-504C from FIG. 5.

At step 610, the resource access system can determine hyperparameter sets corresponding to each analytical model type, for example, using hyperparameter space searches 506A-506C from FIG. 5

At step 612, the resource access system can create, for each first analytical model type, a plurality of first submodels, the plurality of first submodels for each first analytical model type differing by one or more hyperparameters. For example, the plurality of first submodels can include submodels 508A-508J from FIG. 5.

At step 614, the resource access system can train the plurality of first submodels using first training data corresponding to an entity of a plurality of entities, i.e., the entity associated with the entity profile retrieved in step 602. The resource access system can train the plurality of first submodels using the unlabeled and labeled training data generated in steps 604 and 606 respectively.

At step 616, the resource access system can determine a combination of first submodels to form an ensemble classifier model (for example, ensemble classifier model 512, and its submodels 512A-512F) corresponding to the entity. This combination of first submodels can be determined using a form of submodel evaluation, such as submodel evaluation 510 from FIG. 5, for example, multi-armed bandit evaluation.

At step 618, the resource access system can stored the ensemble classifier model in a model cache, wherein the model cache stores a plurality of ensemble classifier models corresponding to the plurality of entities respectively.

Figure 7A:
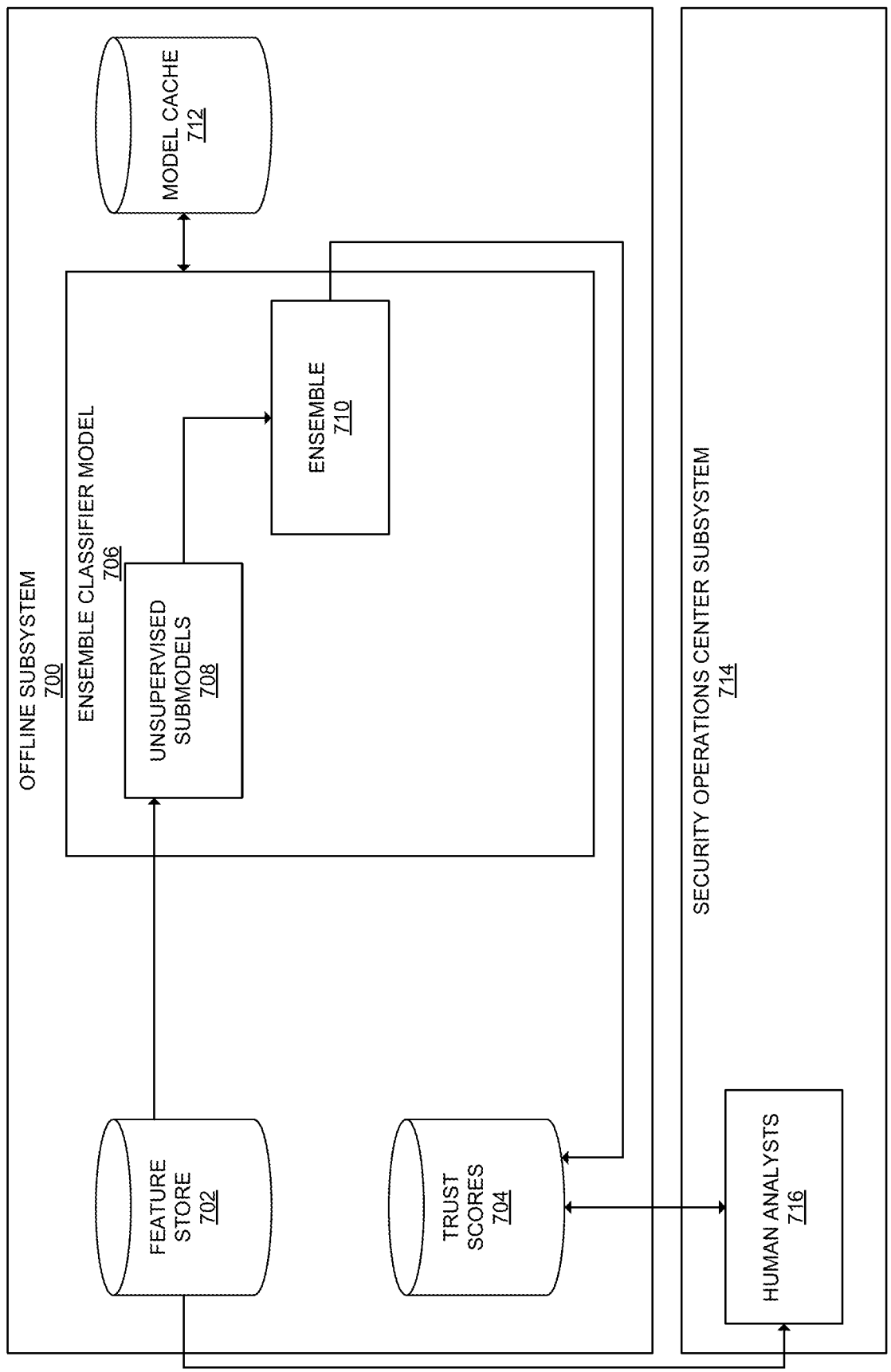
FIG. 7A shows a block diagram of an ensemble classifier model comprising unsupervised submodels according to some embodiments.

FIG. 7A shows a block diagram of an exemplary offline subsystem 700 and security operations center subsystem 714.

The offline subsystem 700 can comprise a feature store database 702, trust scores database 704, ensemble classifier model 706, and model cache 712.

Ensemble classifier model 706 can be comprised of unsupervised submodels 708 and ensemble 710. Unsupervised submodels 708 can be trained using feature vectors from the feature score 702. The trained ensemble classifier model can be stored in model cache 712.

Once ensemble classifier model 706 is trained, ensemble classifier model 706 can be used to determine trust scores associated with feature vectors in feature store 702. These trust scores can be stored in trust score database 704. Alternatively, the feature vectors in feature store 702 can be sent to human analysts 716 for the human analysts 716 to determine the associated trust scores. The human analysts 716 can transmit the determined trust scores back to the offline subsystem 700 to store in trust score database 704. The feature vectors and their associated trust scores can be used to train supervised models at a later time.

Further, if the trained ensemble classifier model 706 determines trust scores associated with feature vectors in feature store 702, the offline subsystem can transmit the feature vectors and their associated trust scores to human analysts 716 and the human analysts 716 can verify the trust scores.

The human analysts 716 can verify the trust scores to determine if each trust score is a reasonable match to the corresponding feature vector. For example, the ensemble classifier model 706 may have determined a trust score that is too low or too high given the feature vector input. The human analysts 716 can discard the feature vector trust and trust score or modify the trust score so that is more in line with the expected result. The human analysts 716 can pay particular attention to ambiguous trust scores near the center of the trust score range (for example, 50 on a 0-100 scale). For feature vectors without corresponding trust scores, the human analysts 716 can determine the associated trust scores themselves. The trust scores and feature vectors can be transmitted back to the online subsystem 700 and stored in trust score database 704 and feature score 702 respectively.

Figure 7B:
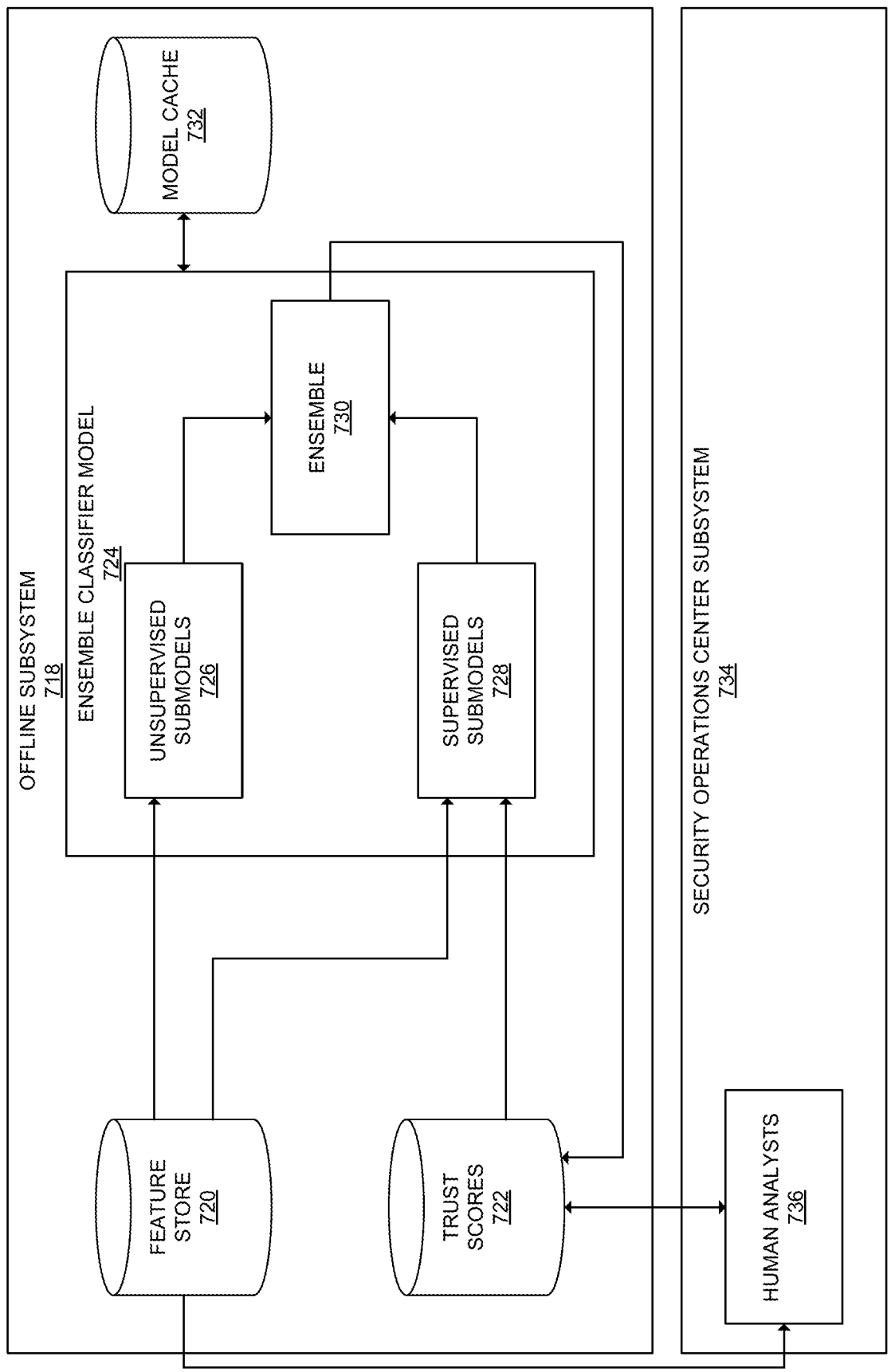
FIG. 7B shows a block diagram of an ensemble classifier model comprising unsupervised and supervised submodels according to some embodiments.

FIG. 7B shows a block diagram of an exemplary offline subsystem 718, comprising feature store 720, trust score database 722, ensemble classifier model 724, and model cache 732. FIG. 7B also shows a security operations center subsystem 734 comprising human analysts 736.

Ensemble classifier model 724 comprises unsupervised submodels 726, supervised submodels 728, and ensemble 730. The ensemble classifier model 724 can be trained by training unsupervised submodels 726 using feature vectors from feature store 720 and by training supervised submodels with feature vectors and their corresponding trust scores from trust score database 726. Once ensemble classifier model 724 is trained, ensemble classifier model 724 can be used to produce trust scores for feature vectors in feature store 720 and store them in trust score database 722.

In some embodiments, ensemble classifier model 724 may be the same ensemble classifier model as ensemble classifier model 706 from FIG. 7A at a different time. For example, at an earlier time, the ensemble classifier model 706 is only comprised of unsupervised submodels 708, and at a later time, ensemble classifier model 724 is comprised of unsupervised submodels 726 and supervised submodels 728. Thus according to some embodiments, the model composition of ensemble classifier models can change over time.

This may occur as a result of more training data becoming available. At an earlier time, there may be a large amount of training data in the form of feature vectors, but little to no training data in the form of trust scores. As such, it is possible to train unsupervised submodels but not possible to train supervised submodels, and a trained ensemble classifier model may only be comprised of unsupervised submodels. As described above with reference to FIG. 7A, the ensemble classifier model 706 can be used to determine trust scores associated with feature vectors and store the trust scores in trust score database 704. These trust scores can then be used in association with feature vectors to train supervised submodels, as shown in FIG. 7B. In effect, the ensemble classifier model 724 is able to self-train by generating its own training data in the form of trust scores. The ensemble classifier model 724 can be stored or retrieved from model cache 732, and the feature vectors and trust scores stored in their respective database can be transmitted to security operations center subsystem 734 where they can be verified by human analysts 736.

Figure 8:
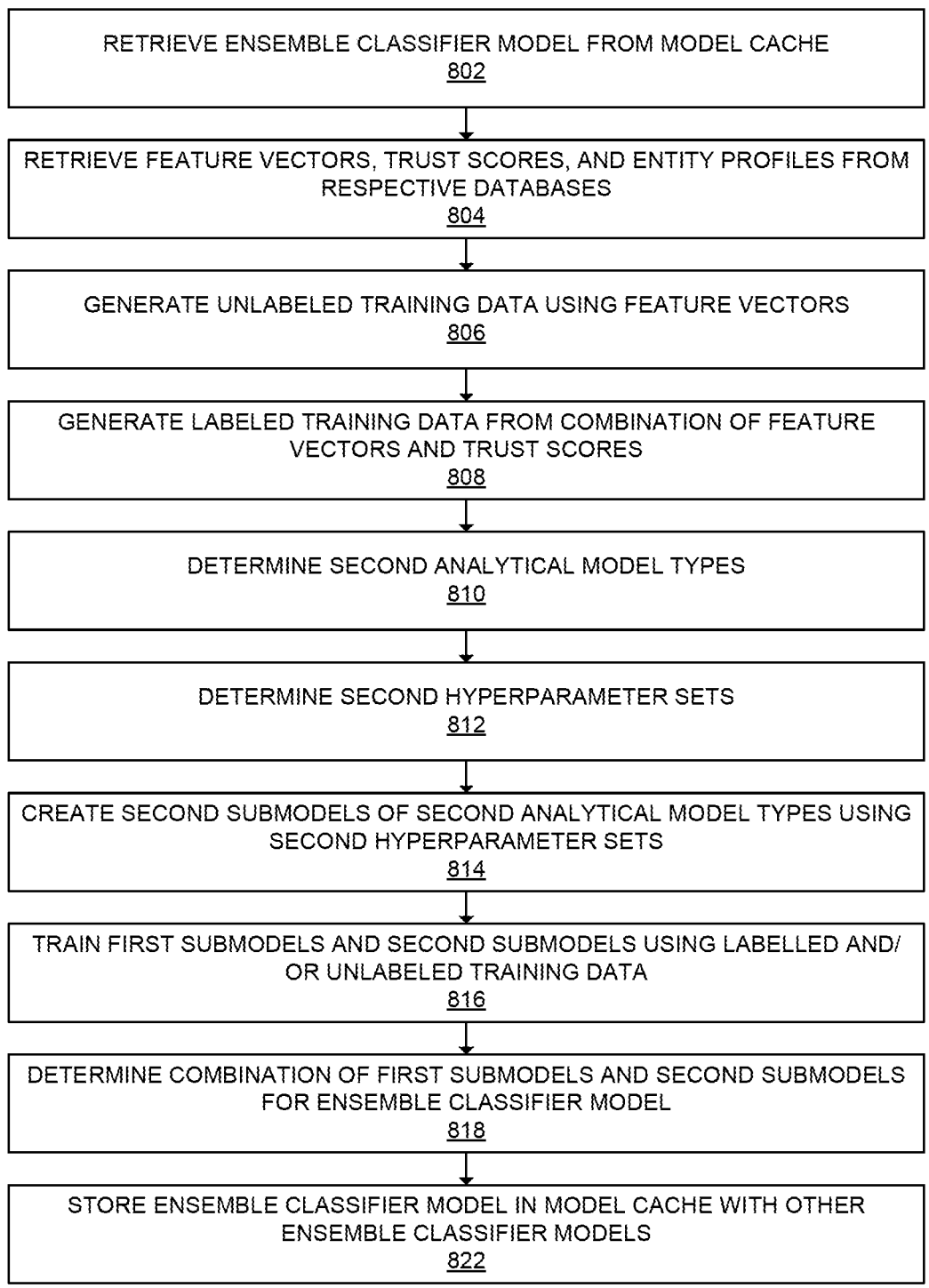
FIG. 8 shows a flow chart of an exemplary method of further training an ensemble classifier model according to some embodiments.

FIG. 8 describes a method 800 for further training an ensemble classifier model according to some embodiments. The method 800 shares many similarities with method 600 from FIG. 6. The notable difference is that FIG. 8 describes training second submodels in addition to training first submodels, as described in FIG. 6. For example, the first submodels could comprise unsupervised submodels. As more training data becomes available (for example, trust scores), the ensemble classifier model can be retrained with the second submodels, which could comprise supervised learning models.

In step 802, the resource access system can retrieve an ensemble classifier model associated with a particular entity or entity profile from the model cache. The resource access system can maintain and store the retrieved ensemble classifier model in some form of working memory while the retrieve ensemble classifier model is further trained.

In step 804, the resource access system can retrieve one or more trust scores associated with the entity or entity profile from a trust score database, and one or more feature vectors associated with the entity or entity profile from a feature vector database. For example, the resource access system can query each database with an entity profile identifier to retrieve feature vectors and trust scores associated with the entity.

In step 806, the resource access system can generate unlabeled training data using the one or more feature vectors. For example, the resource access system can select a subset of the one or more feature vectors to use as unlabeled training data. The unlabeled training data can be used to train unsupervised submodels of the ensemble classifier model.

In step 808, the resource access system can generate labeled training data using the one or more feature vectors and the one or more trust scores. For example, the resource access system can select a subset of the one or more feature vectors and a corresponding subset of the one or more trust scores, and use the feature vectors and trust scores as labeled training data. The labeled training data can train supervised submodels of the ensemble classifier model. The generated unlabeled and labeled training data can collectively be referred to as "second training data," which in some embodiments may differentiate it from "first training data" that may have been used to initially train the ensemble classifier model.

In step 810, the resource access system can determine a second plurality of analytical model types. The second plurality of analytical model types can include some analytical model types that are the same or similar to first analytical model types used to initially train the model. Additionally, the second plurality of analytical model types can include analytical model types that were not used to initially train the system. For example, new analytical model types can be discovered between the initial training and a subsequent training, and the new analytical model types can be included among the second plurality of analytical model types. Additionally, the second plurality of analytical model types can include model types that could not be included among the first analytical model types. For example, if trust scores were not available during the first training, the ensemble classifier model may not include supervised models (see FIG. 7A and discussion above). As trust scores become available, during subsequent trainings, the second plurality of analytical model types can include supervised models (see FIG. 7B and discussion above).

In step 812, the resource access system can determine hyperparameter sets for the first and second analytical model types, in order to perform hyperparameter search to determine submodel hyperparameters (see hyperparameter search spaces 506A-506C from FIG. 5 and discussion above).

In step 814, the resource access system can create, for each second analytical model type, a plurality of second submodels, the second submodels for each analytical model type differing by one or more hyperparameters.

In step 816, the resource access system can train the plurality of first submodels and second submodels using the second training data. For example, training unsupervised first submodels and second submodels using unlabeled training data generated in step 806, and training supervised first submodels and/or second submodels using labeled training data generated in step 808.

In step 818, the resource access system can determine a combination of first submodels and second submodels to form an updated ensemble classifier model. The combination can be determined using a submodel evaluation procedure (for example, submodel evaluation procedure 510 from FIG. 5), such as multi-armed bandit evaluation.

In step 822, the resource access system can store the updated ensemble classifier model in the model cache. The ensemble classifier model can then be accessed by the resource access system at a later time in order to further train the model, test the model, or promote the model to the production model.

Figure 9:
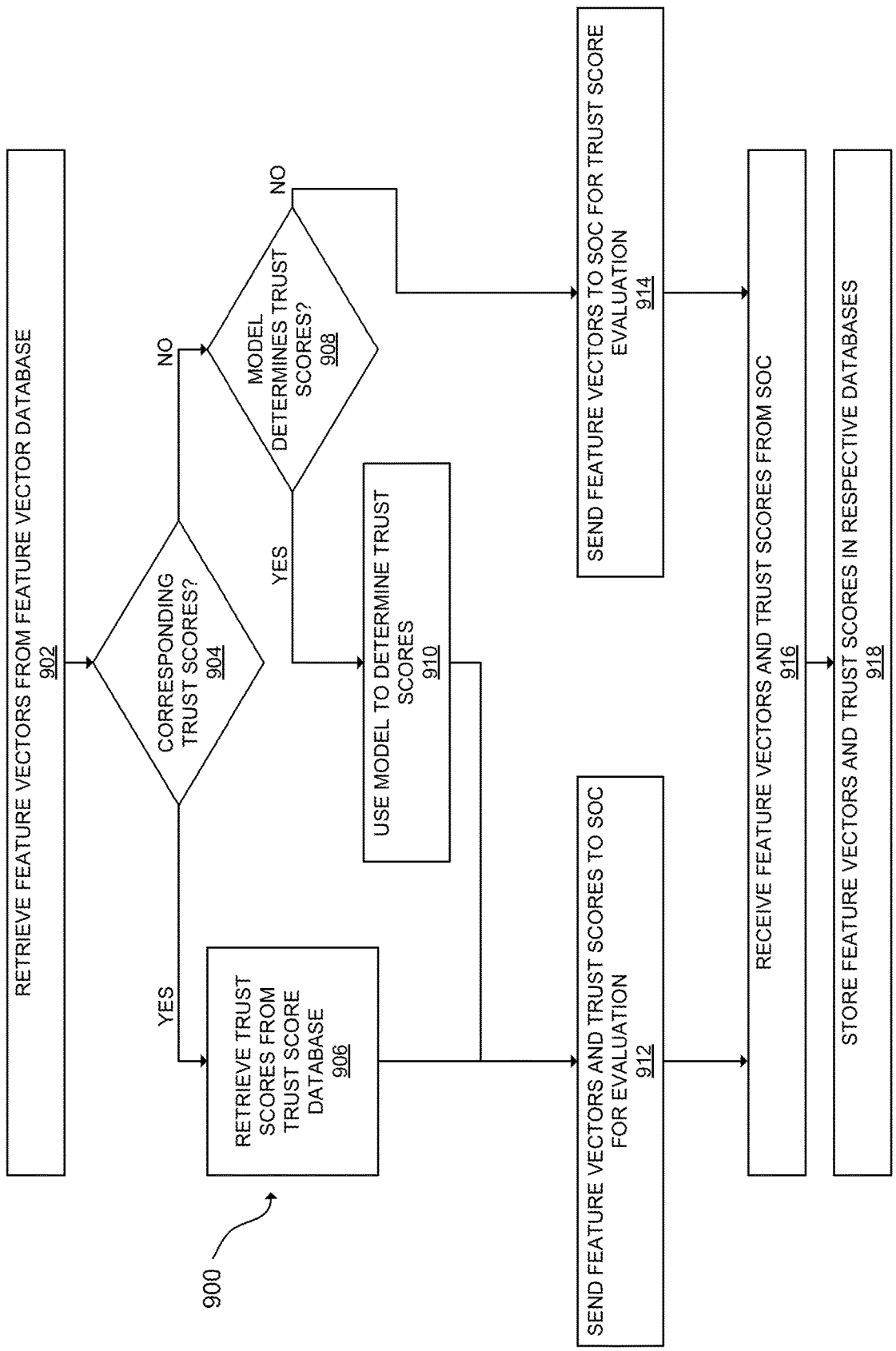
FIG. 9 shows a flow chart of an exemplary method of verifying trust scores and feature vectors according to some embodiments.

FIG. 9 shows a flowchart 900 for an exemplary method of generating trust scores associated with feature vectors stored in a feature vector database.

In step 902, the resource access system can retrieve one or more feature vectors from a feature vector database.

In step 904, the resource access system can determine if there are corresponding trust scores for the feature vectors retrieved in step 902. As one example, the resource access system can search or query the trust score database using feature vector identifiers associated with the feature vectors retrieved in step 902. As another example, the database entries corresponding to the feature vectors retrieved in step 902 can include pointers to corresponding trust scores, and the resource access system can determine if there are corresponding trust scores by determining if a pointer is included in the database entry. If there are corresponding trust scores, the process can proceed to step 906, if there aren't corresponding trust scores, the process flow can proceed to step 908.

At step 906, the resource access system can retrieve the corresponding trust scores from a trust score database.

At step 908, the resource access system can determine if a machine learning model, such as an ensemble classifier model should be used to determine trust scores corresponding to the feature vectors retrieved in step 902. For example, the resource access system can use some form of code or control logic to determine whether an ensemble classifier model is suited to the task. For example, the resource access system could compare a model accuracy statistic to a threshold, and decide to use the model if the model accuracy statistic exceeds the threshold. For example, if a model is able to determine trust scores with greater than 70% accuracy, the model can be used to determine the trust scores and process flow proceeds to step 910. Otherwise, process flow proceeds to step 914.

At step 910, the resource access system can use the model to determine the corresponding trust scores, for example, by applying the feature vectors retrieved in step 902 as inputs to the model to determine the corresponding trust scores. The corresponding trust scores can be stored in a trust score database.

At step 912, the resource access system can transmit the one or more feature vectors to the security operations center subsystem. A human analyst of the security operations center subsystem can evaluate the trust scores and feature vectors and verify them, for example, determine if a given trust score is an appropriate match for its corresponding feature vector, as described above with reference to FIGS. 7A-7B. Alternatively, the security operations center subsystem may use machine analysts instead of human analysts. The machine analysts may be special systems or machine learning models used to evaluate and verify the trust scores and feature vectors. For example, a machine learning model of the security operations center subsystem could receive the feature vectors and trust scores as inputs and automatically produce a verification score, or alternatively output verified or modified feature vectors and trust scores.

At step 914, the resource access system can transmit the one or more feature vectors to the security operations center, wherein a human analyst of the security operations center determines one or more trust scores associated with the one or more feature vectors.

At step 916, the resource access system can receive the one or more trust scores from the security operations center.

At step 918, the resource access system can store the one or more feature vectors in the feature vector database, and store the one or more trust scores in the trust score database in association with the one or more feature vectors.

Figure 10:
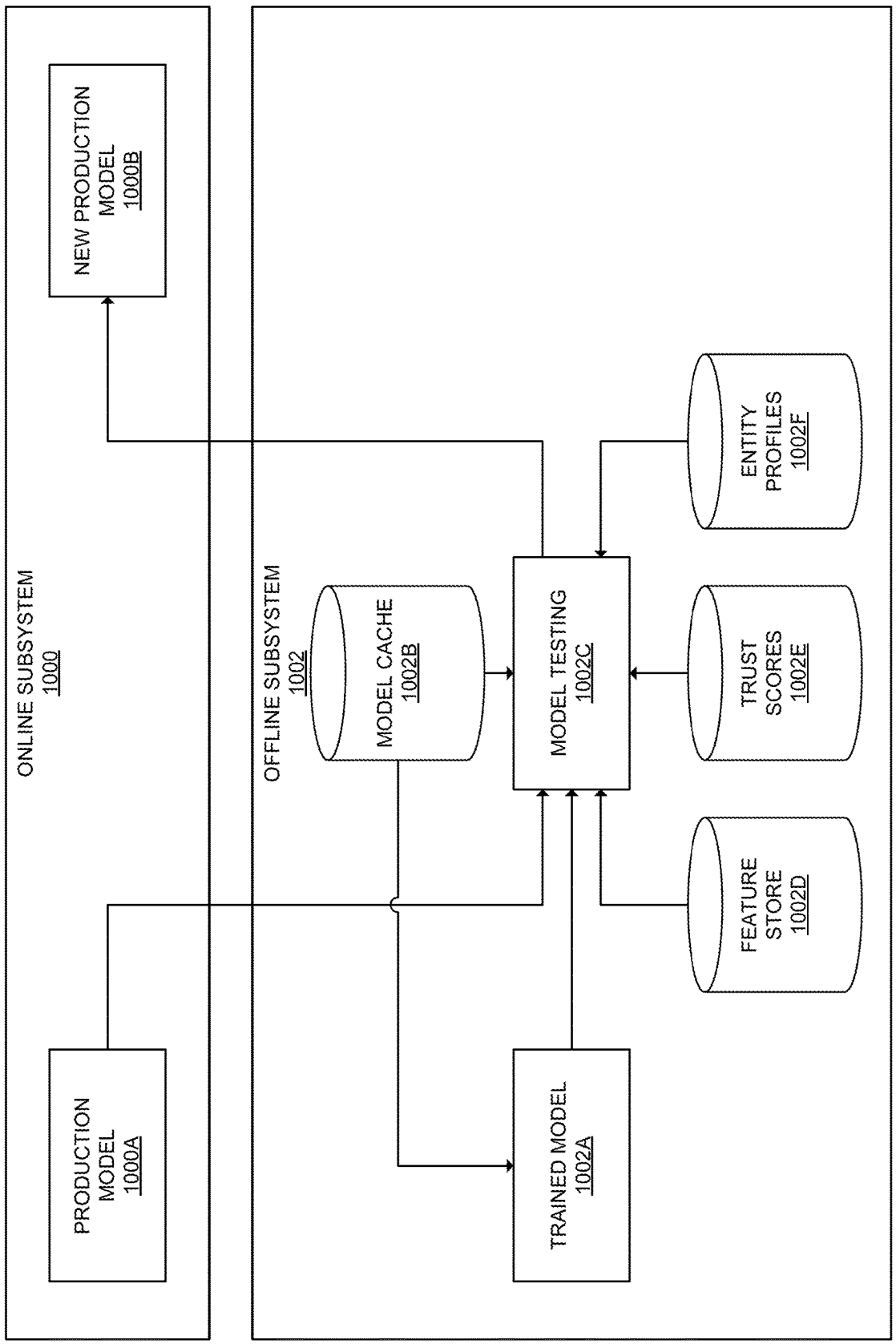
FIG. 10 shows a block diagram of an exemplary model testing system according to some embodiments.

FIG. 10 shows a system block diagram of exemplary online subsystem 1000, comprising a production model 1000A and new production model 1000B. FIG. 10 also shows an exemplary offline subsystem 1002, comprising a trained model 1002A, a model cache 1002, a model testing element 1002C, a feature store 1002D, a trust score database 1002E, and entity profiles 1002F.

The system and components shown in FIG. 10 can be used by the resource access system in order to compare machine learning models to determine the best performing machine learning model. The offline subsystem can compare the production model 1000A, a trained or recently trained model 1002A, and any number of models from model cache 1002B using the model testing element 1002C. The model testing element 1002C can retrieve feature vectors and trust scores from the feature store 1002D and trust score database 1002E respectively. The retrieved feature vectors and trust scores can be used to generate a training data set. The model testing element 1002C can test the models by applying feature vectors as inputs to the models being tested and comparing the resulting trust score outputs against the corresponding trust scores. The model's accuracy can be determined as a difference or deviation from the corresponding trust scores.

The model testing element 1002C can use any appropriate testing procedure to compare models. For example, the model testing element 1002C can employ A/B testing in order to compare one model directly against another model.

The model testing element 1002C can promote the best performing model, based on the testing procedure to be the new production mode 1000B. In this way, the best performing model can be used to evaluate future resource access requests.

Figure 11:
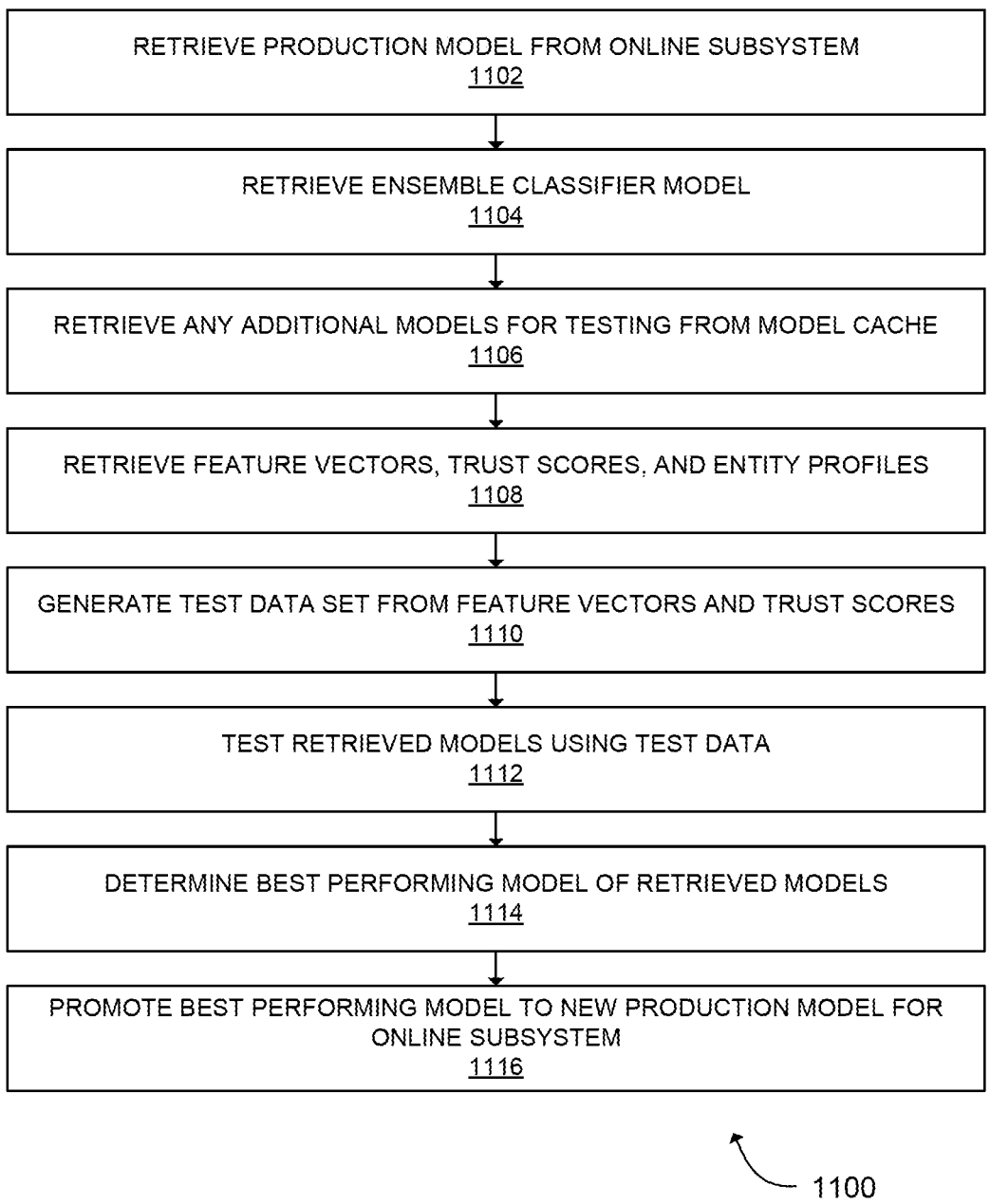
FIG. 11 shows a flow chart of an exemplary method of model testing according to some embodiments.

FIG. 11 shows a flowchart of an exemplary method for testing machine learning models and promoting a machine learning model to the production model, according to some embodiments.

At step 1102, the offline subsystem of the resource access system can retrieve the production model corresponding to an entity from the online subsystem. This production model may be a first production model. For example, the offline subsystem can transmit a command to a software or hardware element of the online subsystem that stores production models, indicate the relevant entity, and receive the production model corresponding to that entity.

At step 1104, the resource access system can retrieve an ensemble classifier model corresponding to the entity. This can be an ensemble classifier model retrieved from the model cache, or it can be an ensemble classifier model that has been recently trained and has been retrieved from some form of working or short term memory.

At step 1106, the resource access system can retrieve any additional models corresponding to the entity for testing from the model cache.

At step 1108, the resource access system can retrieve feature vectors corresponding to the entity and corresponding trust scores from the feature vector database and trust score database respectively.

At step 1110, the resource access system can generate test data corresponding to the entity from the feature vectors and trust scores, for example, selecting a subset of feature vectors and their corresponding trust scores to be used as test data.

At step 1112, the resource access system can test the ensemble classifier model, the production model, and the additional models for testing using the test data corresponding to the entity. For example, by providing the feature vectors as inputs to each model being tested, and comparing the resulting trust scores against the corresponding trust scores determined in step 1108, then evaluating each model based on the error or deviation from the corresponding trust scores.

At step 1114, the resource access system can determine the best performing model of the retrieved models, such as the model with the lowest error or deviation from the corresponding trust scores or the highest accuracy. The best performing model can be used as a new production model. In some embodiments, the resource access system may only directly compare the production model against the ensemble classifier model. In these embodiments, the resource access system may determine a new production model based on the testing, wherein the new production model is a better performing model of the ensemble classifier model and the production model. The new production model may be a second production model.

At step 1116, the resource access system can promote the best performing model to the new production model for the online subsystem. i.e., replace the current production model (the first production model) with the new production model (the second production model). The resource access system can, for example, overwrite the production model in the online subsystems memory with the new production model, such that the online subsystem uses the new production model for analyzing requests to access resources.

Figure 12:
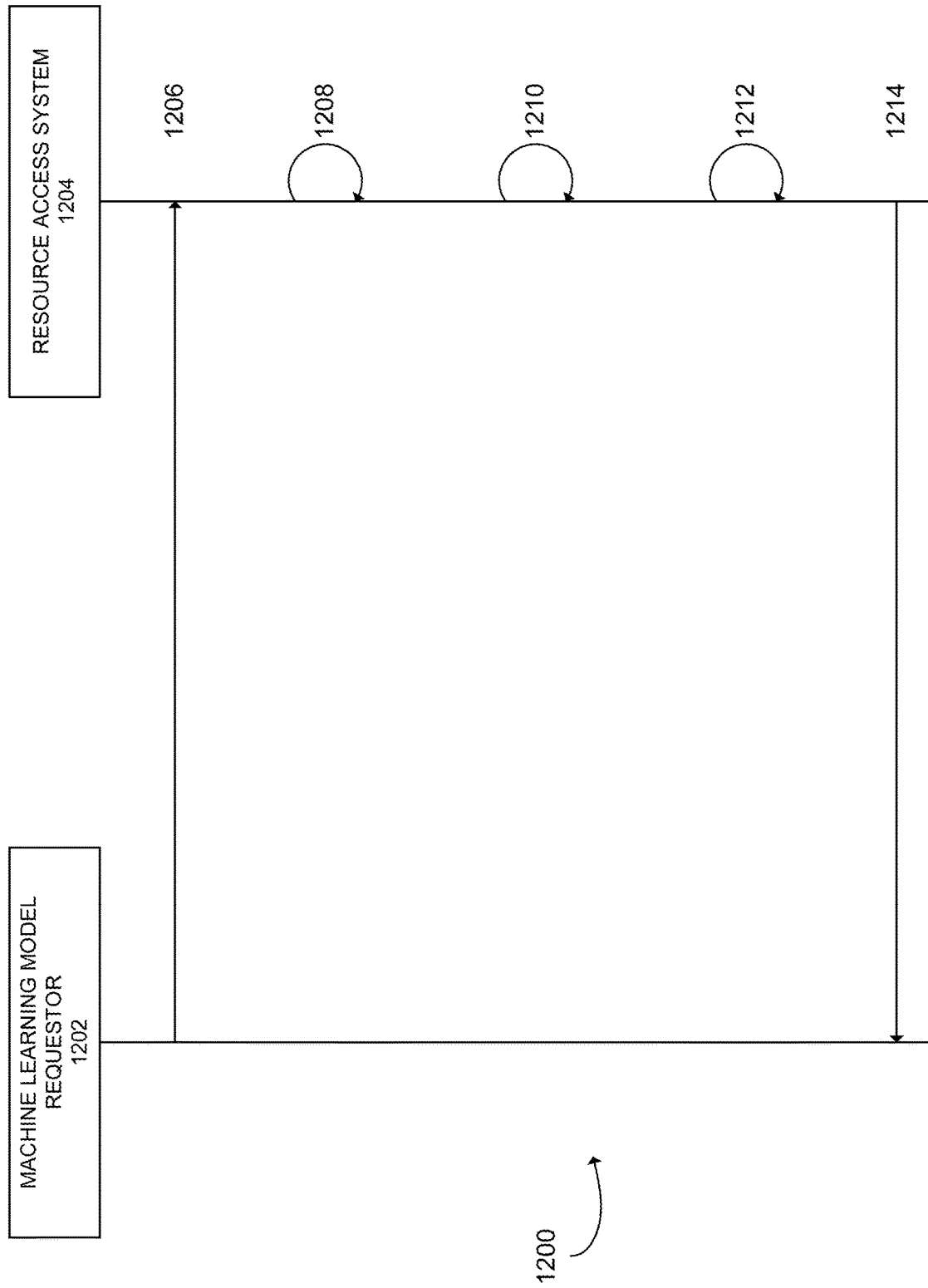
FIG. 12 shows a sequence diagram of generating a machine learning model for a requestor using natural language processing according to some embodiments.

FIG. 12 shows a sequence diagram 1200 processing machine learning model requests using natural language processing according to some embodiments.

The resource access system 1204 can receive a request for a machine learning model from a machine learning model requestor 1202. As an example, the machine learning model requestor 1202 could be a business executive that wants to use machine learning for some application. For example, the machine learning model requestor 1202 may want a machine learning model to determine the probability that the price of a good will drop, given some data the executive believes is predictive. As another example, the machine learning model requestor 1202 could be a person who wants to determine the probability that financial information will be stolen from a secure database on a given day, given some data that the person believes is predictive.

At step 1206, the resource access system 1206 can receive, from the machine learning model requestor 1202, a request for a machine learning model. The request for the machine learning model can comprise a query and a training data set. The query can comprise human-readable text or an audio recording of human speech, among others. For example, the request can be something like: "I want a model that generates a score that indicates how likely it is that financial information will be stolen from a particular secure database, given prior access requests, security parameters, etc."

At step 1208, using a natural language processor, the resource access system 1204 can process the request to determine the machine learning model requestor's 1202 needs. The natural language processor can be a machine learning system trained on an extensive corpus of spoken and written works. As such, the resource access system 1204 may have a rudimentary understanding of the language the request was made in. The resource access system 1204 can also determine a model cache query, which can be used to query a model cache in order to identify the machine learning model. The model cache query can comprise one or more keywords determined by the resource access system 1204 using natural language processing.

With the above example request, the resource access system 1204 may identify the fragment "I want" and may determine that the text following "I want" corresponds to a need of the user. The resource access system 1204 may additionally detect the keyword "model" and determine that the machine learning model requestor 1202 wants a machine learning model. The resource access system 1204 may analyze the fragment "model that generates a score" and determine that the machine learning model requestor 1202 wants a model that outputs a score on some range, rather than a binary classifier. The resource access system may look at the phrase "how likely" and determine that the score should be a probability and should be on a range 0%-100%. Next, the resource access system 1204 may look at the fragment "financial information will be stolen from a particular secure database" and determine that the model relates to the concepts of theft prevention and financial information. The resource access system 1204 may look at the fragment "given prior access requests, security parameters, etc." and may determine, based on learned knowledge of common expression, that the elements following "given" correspond to the features that should be used in feature vectors for the machine learning model. Further, the resource access system 1204 may determine, based on "etc." that the machine learning model requestor 1202 envisions the use of features other than the two previously listed (prior access requests and security parameters), and the resource access system 1204 may look at the provided training data to determine other appropriate features.

At step 1210, the resource access system 1204 may search the model cache for a model that is suited to handle the machine learning model requestor's 1202 request. As one example, the resource access system 1204 could extract keywords based on the natural language processing in step 1208, such as "theft prevention" "access request data" and "security parameters." The resource access system 1204 could search the model cache for models matching one or more of the keywords, then perform additional analysis to determine if those models would be appropriate for its understanding of the application.

At step 1212, once the resource access system 1204 has determined an appropriate base-model, the resource access system 1204 can train the model using the data provided by the machine learning requestor 1202 with the request. The training process can use any of the techniques discussed above, as well as conventional machine learning training techniques.

At step 1214, the resource access system 1204 can transmit the model back to the machine learning model requestor 1202. The model can take a number of forms. For example, the model could be an executable application, a script for a scripting language (such as Python), or a file that can be interpreted by a machine learning application to implement the model. The machine learning model requestor 1202 is now free to use the received model for their intended application.

The use of natural language processing to identify and produce machine learning models is particularly advantageous, because it is difficult for people to articulate an application for machine learning without resorting to language. As such, a system that develops a human-like understanding of the meaning of words and sentences is better suited to evaluating such requests. Conventional methods of parsing text input queries involve identifying particular words and directly using those words as keywords in order to interpret the meaning of the text. However, in most cases the meaning of a sentence is not just the meaning of the words comprising the sentence, but also the meaningful interactions between the words. Conventional text parsing systems fail to account for these interactions.

For machine learning applications in particular, subtext and contextual information are important in determining an appropriate machine learning model for the machine learning model requestor's application. A "model to predict misuse of company resources" and a "model to predict misuse of nuclear weapons" both involve predicting misuse, however the contexts of company resource allocation and nuclear warfare are vastly different. A conventional system may not be able to identify these contextual differences by parsing keywords. In contrast, embodiments allow for a resource access system to use natural language processing to develop a more in-depth understanding of a machine learning model request, allowing the resource access system to more accurately identify the appropriate machine learning model.

Figure 13:
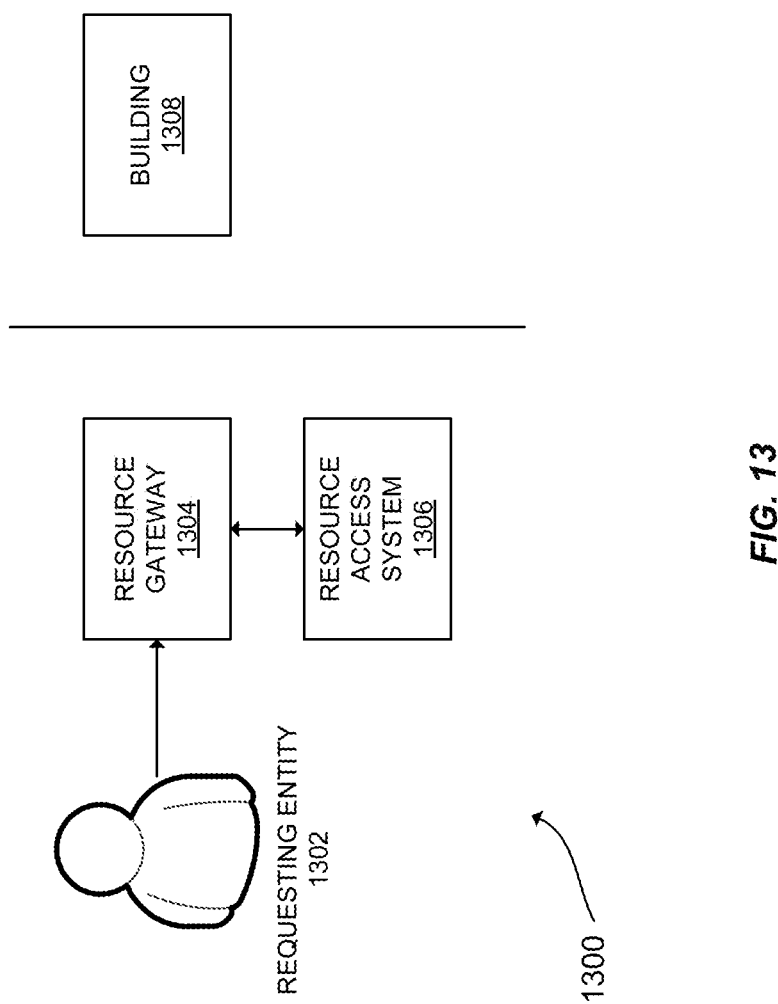
FIG. 13 shows an application of a resource access system for controlling access to a secure building according to some embodiments.

FIG. 13 shows an exemplary system 1300 used to control access to a building, comprising a requesting entity 1302, a resource gateway 1304, a resource access system 1306, and a building 1308.

In an example use case, a requesting entity 1302, such as a human user, may wish to gain access to a secure building 1308. For example, the building 1308 could be an apartment complex that is protected by a gate with a computerized lock.

The resource gateway 1304 could be an access terminal that the requesting entity 1302 can use to input data in order to access the building 1308. For example, the resource gateway 1304 could have a display and some form of user input device, such as a keyboard, and could prompt the requesting entity 1302 to enter their request to access the building 1308.

The requesting entity 1302 could provide the resource gateway 1304 with their request. This may involve the requesting entity 1302 providing the resource gateway 1304 with a credential (such as a user identifier) and a passcode to enter the building. The requesting entity 1302 could provide this information to the resource gateway 1304 using the user input device on the resource gateway 1304.

The resource gateway 1304 can then collect any additional request data associated with the request, for example, what time the requesting entity 1302 is making the request to access the building. The resource gateway 1304 can transmit the request to access the resource to the resource access system 1306.

The resource access system 1306 may comprise a computer or server computer, either on site or remote. The resource access system 1306 can also comprise a security operations center subsystem, such as a guard room and surveillance personnel. The resource access system 1306 can use the request data to determine an entity profile associated with the requesting entity 1302. For example, the resource access system 1306 can use the received credential to search through an entity profile database that stores profiles of people that live in the building 1308. The resource access system 1306 can use the request data to generate a feature vector. The resource access system 1306 can also include data from the entity profile database in the feature vector. For example, the requesting entity 1302 may have a calendar application synced up with the entity profile in order to inform the resource access system 1306 when they will be out of town. The resource access system 1306 can determine a production model corresponding to the entity profile.

Using the feature vector and the production model, the resource access system 1306 can determine a trust score. If the requesting entity's 1302 behavior is normal, for example, their credential and passcode are valid, and they are attempting to access the building 1308 at a normal time (i.e., after getting off of work), the trust score may be high (such as 95 on a 0-100 scale).

The resource access system 1306 may then use their policy engine to determine how to handle the request to access the building 1308. If the trust score is high, the resource access system 1306 may allow access to the building 1308. The resource access system 1306 may transmit a signal to a computerized lock on the building's 1308 door, causing the door to open. Alternatively, the resource access system 1306 may transmit a message to the resource gateway 1304 and the resource gateway 1304 may cause the building's 1308 door to open.

Alternatively, the requesting entity 1302 may have provided a correct credential and passcode, but they may be requesting access to the building 1308 at an unusual time, such as late at night or early in the morning. As such, the production model may produce a lower trust score. The policy engine may determine a resource access policy such as system level triage. The resource access system 1306 may transmit a message to the resource gateway 1304, indicating that the resource gateway 1304 should request additional information from the requesting entity 1302. The resource gateway 1304 could prompt the requesting entity 1302, via its display, to answer a security question, such as "what is your mother's maiden name?" The requesting entity 1302 could answer the question via a user input device on the resource gateway 1304, and the answer could be transmitted to the resource access system 1306. If the answer is correct, the resource access system 1306 could unlock the door and let the requesting entity 1302 in the building 1308. If the answer is incorrect, the resource access system 1308 could prevent the requesting entity 1302 from entering the building 1308.

Alternatively, the resource gateway 1304 can have a biometric interface, such as a face or iris scanner. The additional information can include a scan of the requesting entity's 1302 face, and the resource access system 1306 can evaluate the scan to determine if the requesting entity 1302 is who they claim to be.

In another alternative trust score case, the requesting entity 1302 may have provided a correct credential, but provided a close, but incorrect passcode. Additionally, the requesting entity 1302 is attempting to access the building

1308 late at night. As a result, the trust score may be relatively low. The policy engine may determine a resource access policy such as human level triage. The resource access system 1306 may alert the surveillance personnel in the guard room that a requesting entity 1302 is attempting to access the building 1308, and the request could not be confirmed as legitimate. A surveillance personnel could observe the requesting entity 1302 via a security camera, or establish communication with the requesting entity 1302 via an intercom system. If the surveillance personnel is satisfied that the requesting entity 1302 is legitimate, the surveillance personnel could grant the requesting entity 1302 access to the building 1308.

As another alternative trust score case, the requesting entity 1302 may have provided an incorrect credential and an incorrect passcode. The production model's resulting trust score is very low. The policy engine could determine a resource access policy such as preventing the requesting user 1302 from accessing the building.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, for example, connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (for example, an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Per or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (for example, via Internet download). Any such computer readable medium may reside on or within a single computer product (for example a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
   determining, by a resource access system, a first plurality of analytical model types;
   creating, by the resource access system, for each first analytical model type, a plurality of first submodels, the plurality of first submodels differing by one or more hyperparameters, wherein the one or more hyperparameters are set before training the plurality of first submodels and wherein the one or more hyperparameters affect training and performance of the plurality of first submodels;
   training, by the resource access system, the plurality of first submodels using first training data corresponding to an entity of a plurality of entities, wherein each first submodel of the plurality of first submodels is configured to produce a trust score corresponding to a feature vector input to that first submodel;

determining, by the resource access system, a combination of first submodels to form an ensemble classifier model corresponding to the entity, wherein the ensemble classifier model is configured to produce a combined trust score by combining trust scores produced by the first submodels; and storing, by the resource access system, the ensemble classifier model in a model cache, wherein the model cache stores a plurality of ensemble classifier models corresponding to the plurality of entities respectively.

2. The method of claim 1, further comprising:

testing, by the resource access system, the ensemble classifier model and a first production model using test data corresponding to the entity, thereby producing a plurality of trust scores corresponding to the ensemble classifier model and a plurality of trust scores corresponding to the first production model;

determining, by the resource access system, an ensemble classifier model error by comparing the plurality of trust scores corresponding to the ensemble classifier model to a plurality of test trust scores corresponding to the test data;

determining, by the resource access system, a first production model error by comparing the plurality of trust scores corresponding to the first production model to the plurality of test trust scores;

determining, by the resource access system, a second production model based on the testing, wherein the second production model is a better performing model of the ensemble classifier model and the first production model, wherein the better performing model comprises a model with a lower corresponding error of the ensemble classifier model error and the first production model error; and replacing, by the resource access system, the first production model with the second production model.

3. The method of claim 1, further comprising:

retrieving, by the resource access system, one or more feature vectors from a feature vector database;

transmitting, by the resource access system, the one or more feature vectors to a security operations center, wherein an analyst of the security operations center determines one or more trust scores associated with the one or more feature vectors;

receiving, by the resource access system, from the security operations center, the one or more trust scores; and storing, by the resource access system, the one or more trust scores in a trust score database in association with the one or more feature vectors, wherein the first training data comprises the one or more trust scores and the one or more feature vectors.

4. The method of claim 1, further comprising:

retrieving, by the resource access system, the ensemble classifier model from the model cache, one or more trust scores associated with the entity from a trust score database, and one or more feature vectors associated with the entity from a feature vector database;

generating, by the resource access system, second training data comprising the one or more trust scores and the one or more feature vectors;

generating, by the resource access system, an updated ensemble classifier model using the second training data and the ensemble classifier model; and storing, by the resource access system, the updated ensemble classifier model in the model cache.

5. The method of claim 1, further comprising:

receiving, by the resource access system, from a requesting entity, a request to access a resource, the request to access the resource comprising request data;

determining, by the resource access system, based on the request data, an entity profile associated with the requesting entity;

generating, by the resource access system, a feature vector based on the request data;

determining, by the resource access system, a production model corresponding to the entity profile, wherein the production model comprises the ensemble classifier model; and determining, by the resource access system, a trust score by applying the feature vector as an input to the production model.

6. The method of claim 4, wherein the step of generating the updated ensemble classifier model comprises:

determining, by the resource access system, a second plurality of analytical model types;

creating, by the resource access system, for each second analytical model type, a plurality of second submodels, the second submodels differing by one or more second hyperparameters, wherein the one or more second hyperparameters are set before training the plurality of second submodels and wherein the one or more second hyperparameters affect training and performance of the plurality of second submodels;

training, by the resource access system, the plurality of first submodels and the plurality of second submodels using the second training data, wherein each second submodel of the plurality of second submodels is configured to produce a trust score corresponding to a feature vector input to that second submodel; and determining, by the resource access system, a combination of first submodels and second submodels to form the updated ensemble classifier model, wherein the ensemble classifier model is configured to produce a combined trust score by combining trust scores produced by the first submodels and the second submodels.

7. The method of claim 5, wherein the requesting entity is a user or client computer that seeks to access resources in a resource database in communication with the resource access system.

8. The method of claim 5, further comprising:

storing, by the resource access system, the trust score in a trust score database in association with the entity profile; and storing, by the resource access system, the feature vector in a feature vector database in association with the entity profile.

9. The method of claim 5, further comprising:

determining, by the resource access system, one or more exceeded thresholds by comparing the trust score against one or more predetermined thresholds;

determining, by the resource access system, a maximum exceeded threshold of the one or more predetermined thresholds;

determining, by the resource access system, a resource access policy of one or more resource access policies corresponding to the maximum exceeded threshold; and applying, by the resource access system, the resource access policy.

10. The method of claim 9, wherein the one or more resource access policies comprise one or more of the following: allowing access to the resource, denying access to the resource, revoking an access credential, transmitting a request for further evaluation to a security operations center, and transmitting a request for additional request data to the requesting entity.

11. A resource access system comprising:
a processor; and
a non-transitory computer readable medium coupled to the processor, the non-transitory computer readable medium comprising code executable by the processor for performing a method comprising:
determining a first plurality of analytical model types;
creating, for each first analytical model type, a plurality of first submodels, the first submodels differing by one or more hyperparameters, wherein the one or more hyperparameters are set before training the plurality of first submodels and wherein the one or more hyperparameters affect training and performance of the plurality of first submodels;
training the plurality of first submodels using first training data corresponding to an entity of a plurality of entities, wherein each first submodel of the plurality of first submodels is configured to produce a trust score corresponding to a feature vector input to that first submodel;
determining a combination of first submodels to form an ensemble classifier model corresponding to the entity, wherein the ensemble classifier model is configured to produce a combined trust score by combining trust scores produced by the first submodels; and
storing the ensemble classifier model in a model cache, wherein the model cache stores a plurality of ensemble classifier models corresponding to the plurality of entities respectively.

12. The resource access system of claim 11, wherein the method further comprises:
testing the ensemble classifier model and a first production model using test data corresponding to the entity, thereby producing a plurality of trust scores corresponding to the ensemble classifier model and a plurality of trust scores corresponding to the first production model;
determining an ensemble classifier model error by comparing the plurality of trust scores corresponding to the ensemble classifier model to a plurality of test trust scores corresponding to the test data;
determining a first production model error by comparing the plurality of trust scores corresponding to the first production model to the plurality of test trust scores;
determining a second production model based on the testing, wherein the second production model is a better performing model of the ensemble classifier model and the first production model, wherein the better performing model comprises a model with a lower corresponding error of the ensemble classifier model error and the first production model error; and
replacing the first production model with the second production model.

13. The resource access system of claim 11, wherein the method further comprises:
retrieving one or more feature vectors from a feature vector database;
transmitting the one or more feature vectors to a security operations center, wherein an analyst of the security operations center determines one or more trust scores associated with the one or more feature vectors;
receiving, from the security operations center, the one or more trust scores; and
storing the one or more trust scores in a trust score database in association with the one or more feature vectors, wherein the first training data comprises the one or more trust scores and the one or more feature vectors.

14. The resource access system of claim 11, wherein the method further comprises:
retrieving the ensemble classifier model from the model cache, one or more trust scores associated with the entity from a trust score database, and one or more feature vectors associated with the entity from a feature vector database;
generating second training data comprising the one or more trust scores and the one or more feature vectors;
generating an updated ensemble classifier model using the second training data and the ensemble classifier model; and
storing the updated ensemble classifier model in the model cache.

15. The resource access system of claim 11, wherein the method further comprises:
receiving, from a requesting entity, a request to access a resource, the request to access the resource comprising request data;
determining, based on the request data, an entity profile associated with the requesting entity;
generating a feature vector based on the request data;
determining a production model corresponding to the entity profile, wherein the production model comprises the ensemble classifier model; and
determining a trust score by applying the feature vector as an input to the production model.

16. The resource access system of claim 14, wherein the step of generating the updated ensemble classifier model comprises:
determining a second plurality of analytical model types;
creating, for each second analytical model type, a plurality of second submodels, the second submodels differing by one or more second hyperparameters, wherein the one or more second hyperparameters are set before training the plurality of second submodels and wherein the one or more second hyperparameters affect training and performance of the plurality of second submodels;
training the plurality of first submodels and the plurality of second submodels using the second training data, wherein each second submodel of the plurality of second submodels is configured to produce a trust score corresponding to a feature vector input to that second submodel; and
determining a combination of first submodels and second submodels to form the updated ensemble classifier model, wherein the ensemble classifier model is configured to produce a combined trust score by combining trust scores produced by the first submodels and the second submodels.

17. The resource access system of claim 15, wherein the requesting entity is a user or client computer that seeks to access resources in a resource database in communication with the resource access system.

18. The resource access system of claim 15, wherein the method further comprises:
storing the trust score in a trust score database in association with the entity profile; and
storing the feature vector in a feature vector database in association with the entity profile.

19. The resource access system of claim 15, wherein the method further comprises:
  determining one or more exceeded thresholds by comparing the trust score against one or more predetermined thresholds;
  determining a maximum exceeded threshold of the one or more predetermined thresholds;
  determining a resource access policy of one or more resource access policies corresponding to the maximum exceeded threshold; and
  applying the resource access policy.

20. The resource access system of claim 19, wherein the one or more resource access policies comprise one or more of the following: allowing access to the resource, denying access to the resource, revoking an access credential, transmitting a request for further evaluation to a security operations center, and transmitting a request for additional request data to the requesting entity.

* * * * *